Figure 1:
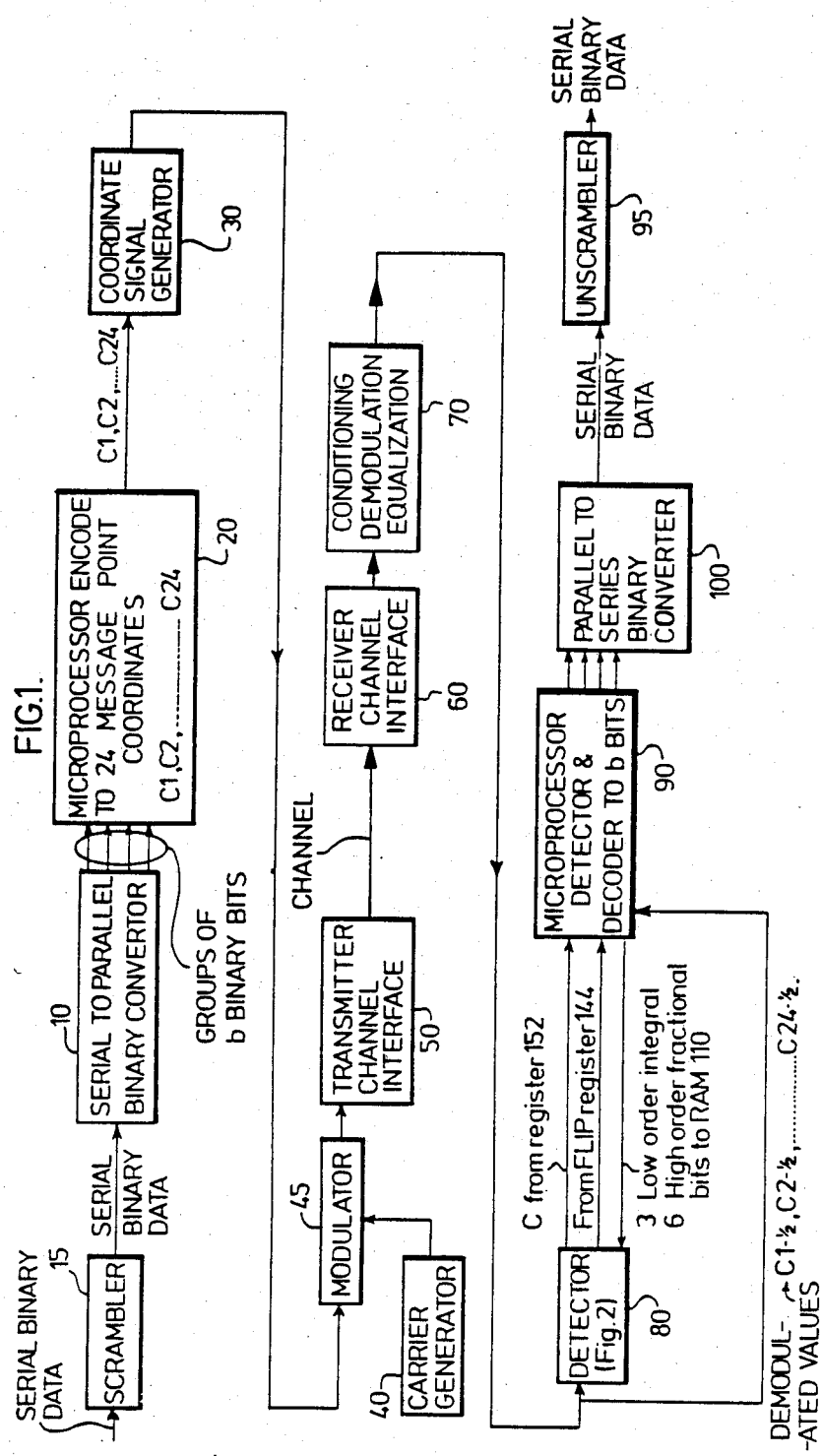

United States Patent [19]

Longstaff et al.

[11] Patent Number: 4,731,799

[45] Date of Patent: * Mar. 15, 1988

[54] MEANS AND METHOD FOR BLOCK ENCODING DETECTION AND DECODING

[75] Inventors: Fred M. Longstaff, Islington; Gordon R. Lang, Bolton, both of Canada

[73] Assignee: Motorola Canada Limited, N. York, Canada

[*] Notice: The portion of the term of this patent subsequent to Dec. 16, 2003 has been disclaimed.

[21] Appl. No.: 819,709

[22] Filed: Jan. 17, 1986

Related U.S. Application Data

[63] Continuation-in-part of Ser. No. 629,110, Jul. 9, 1984, abandoned.

[51] Int. Cl.[4] .............................................. H04L 23/02
[52] U.S. Cl. ........................................ 375/39; 371/37; 370/21
[58] Field of Search ...................... 375/2.1, 25, 37, 39, 375/42, 58; 370/18, 21; 178/20.05, 22.06, 22.07; 371/37, 39, 40; 364/725, 826

[56] References Cited

U.S. PATENT DOCUMENTS

| | | | |
|---|---|---|---|
| 3,506,961 | 4/1970 | Abramson et al. | 371/40 |
| 3,792,355 | 2/1974 | Miyata et al. | 364/725 |
| 3,900,721 | 8/1975 | Speiser et al. | 364/725 |
| 4,510,578 | 4/1985 | Miyaguchi et al. | 364/725 |
| 4,630,288 | 12/1986 | Longstaff | 371/37 |

OTHER PUBLICATIONS

N. J. A. Sloane, "The Packing of Spheres", Scientific America, Jan. 1984, vol. 250, No. 1, at p. 116.
G. R. Lang, "Special Rapporteurs Meeting on 9600 Bit/Second Duplex Modem Family", Mar. 1983.
Conway et al, "Fast Quantizing and Decoding Algorithms for Lattice Quantizers and Codes", IEEE Transactions on Information Theory, vol. IT-28 No. 2, Mar. 1982.

Primary Examiner—Robert L. Griffin
Assistant Examiner—Stephen Chin
Attorney, Agent, or Firm—Harold H. Dutton, Jr; Robert L. Westell

[57] ABSTRACT

Numeric signals appearing on a communication channel are converted in blocks of b signals to a number N. The number N is converted to coordinates in K dimensional space where $40 \geq K < 4$. The coordinates are selected to provide suitable packing in the dimensional space represented by K. The values of coordinates selected are modulated on a carrier and transmitted. Apparatus is provided which carries out the above steps.

Where K=24 the coordinates are selected to be expressible in integral form and in integral form are selected so that they have all even values with a sum of 0 modulo 8 or all odd values with a sum of 4 modulo 8.

26 Claims, 3 Drawing Figures

MEANS AND METHOD FOR BLOCK ENCODING DETECTION AND DECODING

This application is a continuation-in-part of application Ser. No. 629,110 filed July 9, 1984 now abandoned.

This invention relates to means and a method of signalling binary or other numeric data on a communications channel. The means and method encode blocks of b units of data into K coordinate signal values which K coordinate values are then modulated on a carrier by whatever modulation is desired. The means and method of the invention also extend to the detection and decoding at the receiver end of the channel.

By the term 'numeric data' in the application and claims there is envisaged data in binary or other numeric forms which will be supplied by physical signals in groups for conversion to message points. In the great majority of cases such data will be represented by binary digits. However, it is noted that the invention extends to data in the form of other numeric bases.

The invention utilizes the fact that the K independent signal values may be treated as the coordinates of a point in K dimensions ('KD' sometimes hereafter). Prior arrangements for signalling binary information have employed 2 dimensional signal structures. (See for example U.S. Pat. No. 3,887,768 to G. D. Forney et al). It is well known that for a given number of message points in 2 dimensional space some structures provide better performance than others. It is less well known that some signal structures in higher dimensional spaces might provide performance that is superior to any known 2 dimensional signal structure. The superiority may be realized in terms of fewer errors at a given signalling rate or in terms of a higher signalling rate for a given statistical possibility of error. The superiority stems principally from the fact that the distance in K dimensional space between two message points increases with increasing K.

A 'message point' is the point in K dimensions defined by the K coordinates.

The term message point is not only used for points in the K dimensions which are used for signalling but also for points in lesser dimensions. For example and as dealt with hereinafter a message point in H dimensions may be identified by the combination of a message point in F dimensions and a message point in G dimensions where F+G equal H. Thus although the signalling is of message points in K dimensions, the term message point applies to points in less than K dimensions which are not signalled per se but which are used in algorithms related to encoding or decoding the message point signalled. It may help with following the terminology herein to note that in higher dimensions than one a number of coordinates equal to the dimension is required to define a message point. In one dimension the coordinate is also the message point.

While the distance between signalled message points may be increased by increasing the power employed in modulating the coordinates on the carrier, thus, in effect increasing all the coordinates proportionally, the requirements for economy in power use prevent this. Accordingly, one of the problems is to find a pattern or scheme for 'packing' or the arrangement of message points in K dimensional space which allows compact arrangement without undue increase in signalling errors. For K for values from 5 to 40 and above, the most advantageous packings are only partly known and only for a few values of K.

In addition to the problem of selecting the best 'packing' arrangement, solutions for the problem of encoding and decoding signal structures for many values K>5 have not been available.

For encoding blocks of b data bits, signalling speed is related to the number of bits which may be encoded per block. A look-up table may be used for small values of b. However, the number of entries in such look up table varies as $2^b$ so that for large values of b the requirements would exceed the capacity of known computer or microprocessor look up tables.

This invention provides means and a method for deriving the coordinates in K dimensions to identify individual blocks of b digits. In particular, algorithms are provided which allow the conversion of each block of b digits into message point coordinates in K space which coordinates uniquely define the block of b digits represented.

Generally the invention utilizes the fact that message points defined by K coordinates may be considered as located in concentric shells about the origin (the point which has 0 values for coordinates), or about another datum defined by K coordinates.

A shell therefore contains those message points where $$\sum_{d=1}^{d=k} (Cd - CDd)^2$$

is the same value where C1, C2, ... CK are the coordinates of the message point and CD1, CD2, ... CDK are the coordinates of the datum. For each K there may be different rules for choice of coordinates and for the modulo sum of the coordinates. Rules which provide good 'packings' are known for K=24, K=8, K=16 but to a lesser degree for other values of K.

The invention generally provides means and method which involves treating each block of b bits as a number N which identifies the sequence of bits in the block. The simplest role is that the number N is the binary number represented by the sequence of bits in the block. This is the role described herein although other roles where the number N defines (that is, is in one-to-one relationship to) the sequence of bits, may be used. Sometimes, and in particular for K=24, the number N may be converted into a quotient M and remainder C before further encoding. A table is provided listing the numbers (not the coordinates) of suitable message points for a sequence of shells in K dimensions. The means provided determines the shell in the sequence whereat the total available points in the sequence is greatest without exceeding M (or N if no conversion is made). The value $X_K$ being M (or N, if no conversion) less the number of points in the sequence, identifies (without locating) a point in the next succeeding shell in the sequence which will define block b. The coordinates corresponding to the point are obtained by the use of splitting algorithms whereby $X_K$ is identified by specified shells and corresponding values of $X_F$ and $X_G$ for each of F and G dimensions where F+G=H=K. By continuing the use of the splitting algorithm to lower and lower dimensional values, K corresponding values of the value $X_K$ in 1 dimension may be derived, the K one dimensional values identifying the value and sign of the coordinates C1, C2 ... CK which define the message point. These coordinates may then be modulated on the carrier. At the receiver, the demodulated coordinates are subjected to a combining algorithm which is basically the reverse of the splitting algorithm and which allows the reconstruction of the number $X_K$ and the shell in K dimensions from the coordinates, and from that the number N and the block of b bits.

It will be noted that the use of splitting algorithms at the transmitter and of combining algorithms at the receiver avoid the use of large look up tables in converting the number M (or N), identifying the block of b digits, to K message point coordinates for signalling and vice versa. Since look up tables of the required capacity are not available for certain combinations of signalling speeds and values of K, the use of the splitting and combining algorithms allows signalling at speeds higher than previously.

Tables may be built up for use with the splitting algorithm beginning with the number of coordinates in 1 dimension which satisfy the coordinate requirements for signalling in K dimensions. These numbers are tabulated. It is found most convenient to tabulate these numbers using the concept of shells where each shell is numbered from 0 in regular intervals, each unit interval corresponding to an increase in the square of the radial distance, $r^2$ from the origin or datum in one dimension, by the square of the permissible interval between coordinates, the latter being used in integral form in most applications.

An example of what has been said above there is now discussed for K=24 and using the Leech pattern matrix an advantageous packing for encoding where the following rules apply. The coordinates are integers and must be all even or all odd. If all even the sum of the coordinate in the signalling dimension must be 0 modulo 8 and if all odd the sum of the coordinates must be 4 modulo 8. Using the Z lattice (one of the 4096 obtainable with the Leech Lattice), the permissible coordinate interval is 4 and one (of 4096) pattern vectors is centred at the origin. The points on shells centered about the origin are contained on what is known as the "Z lattice". Accordingly, in one dimension, the table of permissible values* tabulated by shells is:

| Shell No. (I or J) | $r^2$ | No. of Available Points | Integral Coordinates |
|---|---|---|---|
| S0 | 0 | 1 | 0 |
| S1 | 16 | 2 | 4 or −4 |
| S2 | 32 | 0 | (none) |
| S3 | 48 | 0 | (none) |
| S4 | 64 | 2 | 8 or −8 | and it will be noted that the Shell No is 1/16 the value of the radius squared.

(*The terms 'permissible values' and 'available points' or 'available message points' are used interchangeably herein and 'points' means 'message points')

The available message points in 2 dimensions may be derived using the summing algorithm $$V_{H,n} = \sum_{I=0}^{I=n} V_{F,I} X V_{G,n-I}$$

where n is the shell number, where the number of dimensions F plus the number of dimensions G equals the number of dimensions H; where $V_H$, $V_F$, $V_G$ are the number of available (i.e. satisfying the coordinate requirements) points in H,F,G dimensions respectively and the intervals of I are constant and chosen to ensure that the sum includes all such available points up to n times the square of the interval. I indicates the shell number in dimension F while n-I (often referred to as J) is the shell number in dimension G.

With the algorithm and with F=1, G=1, H=2 the following table is provided for 2 dimensions.

| Shell No. (I or J) | $r^2$ | Total Number of Available Points | Integral Coordinates |
|---|---|---|---|
| S0 | 0 | 1 | 0,0 |
| S1 | 16 | 4 | (±4, 0)(0, ±4) |
| S2 | 32 | 4 | (±4, ±4) |
| S3 | 48 | 0 | none |
| S4 | 64 | 4 | (±8, 0)(0, ±8) |

It will be seen that the algorithm may be used to provide the numbers of available points for all values of H by applying the algorithm to tables for F and G where F+G=H. In this way the available points in 24D for the Z lattice may be determined. Tables of numbers of available coordinate values for dimensions 1, 2, 4, 6, 12, 24 for an origin centred ('Z') lattice with intervals of 4 between coordinates are set out in tables Z1, Z2, Z4, Z6, Z12, 'Offset' attached to the algorithms herein. It should be noted that the Z24 'Offset' table does not include the points which, although derived from the Z12 tables in accord with the algorithm, do not satisfy the modulo rules for the coordinate sum, even though such points would have been indicated by the algorithm. Thus, it will be noted that table Z24 omits the points which the algorithm would have provided for odd numbered shells, since these would not have satisfied the modulo sum rule that the coordinates must be zero modulo 8 (where the coordinates are all even as in the Z lattice).

The Leech matrix provides 4096 pattern vectors each with even and odd sets of values and the Z lattice mentioned above is only one of them.

Although not required by the preferred method disclosed herein, the points represented by the remaining pattern vectors may be determined by constructing tables for the 'all coordinates even' and 'all coordinates odd' pattern vectors, N' and D' respectively.

For all coordinates even the one dimensional table is as follows:

| Shell No (I or J) | $r^2$ | Number of Available Points $N_1$ | Integral Coordinates |
|---|---|---|---|
| 0 | 0 | 0 | none |
| ¼ | 4 | 1 | 2 |
|   |   | (ignoring signs) |   |
| 2/4 | 8 | 0 | none |
| ¾ | 12 | 0 | none |
| 1 | 16 | 0 | none |
| 1¼ | 20 | 0 | none |
| 1 2/4 | 24 | 0 | none |
| 1¾ | 28 | 0 | none |
| 2 | 32 | 0 | none |
| 2¼ | 36 | 1 | 6 |
| 2 2/4 | 40 | 0 | none |

Applying the algorithm provides the number of available points in 2D (ignoring sign changes and omitting rows with no available points):

| Shell No (I or J) | $r^2$ | Number of Available Points $N_2'$ | Integral Coordinates |
|---|---|---|---|
| 2/4 | 8 | 1 | (2,2) |
| 2 2/4 | 40 | 2 | (2,6)(6,2) |

It is noted that the last table is abbreviated to omit rows with no available points and that further the application of the summing algorithms requires rows for each ¼ unit Shell No. interval of I from 0 to n.

With this in mind the tables of the vectors for all even coordinates are built up, resulting in the following tables:

| Shell No (I or J) | $R^2$ | $N_4'$ | $N_8'$ | $N_{16}'$ | $N_{24}'$ |
|---|---|---|---|---|---|
| 0 | 0 | 0 | 0 | 0 | 0 |
| 1 | 16 | 1 | 0 | 0 | 0 |
| 2 | 32 | 0 | 1 | 0 | 0 |
| 3 | 48 | 4 | 0 | 0 | 0 |
| 4 | 64 | 0 | 8 | 1 | 0 |
| 5 | 80 | 6 | 0 | 0 | 0 |
| 6 | 96 | 0 | 28 | 16 | 1 |
| 7 | 112 | 8 | 0 | 0 | 0 |
| 8 | 128 | 0 | 64 | 120 | 24 |
| 9 | 144 | 13 | 0 | 0 | 0 |

Since sign changes have been disregarded in computing these vectors the number of available points in any column is obtained by multiplying the number listed in the table above by $2^D$ where D is the dimension of the vector. However, since the 0 modulo 8 rule for the sum of the coordinates in 24 dimensions removes one degree of freedom, and only D−1 signs may be chosen freely, the number of points for any vector involving "N'" vectors may only be multiplied by $2^{D-1}$.

Combination vectors are required of the Z and N' vectors (since both vectors have even coordinates) so that the summing algorithm becomes:

$$(Z_4 N_4')_n (\text{i.e. } 8D) = \sum_{I=o}^{I=n} Z_{4,I} \times N'_{4,n-I}$$

and the following values are calculated $Z_4 N_4'$; $Z_8 N_8'$; $Z_8 N_{16}'$; $Z_{16} N_8'$; $Z_{12} N_{12}'$ Only vectors in dimensions which are 0 modulo 4 need be combined since these are the only ones which will satisfy the 0 modulo 8 requirement for coordinate sum).

The combination of $Z_1$ and $N_1$ vectors in the products recited above is shown in the table following:

| Shell No (I or J) | $R^2$ | $Z_4 N_4'$ (8D) | $Z_8 N_8'$ (16D) | $Z_8 N_{16}'$ (24D) | $Z_{16} N_8'$ (24D) | $Z_{12} N_{12}'$ (24D) |
|---|---|---|---|---|---|---|
| 0 | 0 | 0 | 0 | 0 | 0 | 0 |
| 1 | 16 | 1 | 0 | 0 | 0 | 0 |
| 2 | 32 | 8 | 1 | 0 | 1 | 0 |
| 3 | 48 | 28 | 16 | 0 | 32 | 1 |
| 4 | 64 | 64 | 120 | 1 | 488 | 24 |
| 5 | 80 | 126 | 576 | 16 | 4736 | 276 |
| 6 | 96 | 224 | 2060 | 128 | 33020 | 2048 |
| 7 | 112 | 344 | 6048 | 704 | 177472 | 11178 |
| 8 | 128 | 512 | 15424 | 3048 | 772672 | 48576 |
| 9 | 144 | 757 | 35200 | 11104 | 2834176 | 177400 |

The total even points per (24D) shell now becomes:

$Z_{24} + (Z_{16} N_8' \times 759 \times 128) + (Z_{12} N_{12}' \times 2576 \times 2048) + (Z_8 N_{16}' \times 759 \times 32768) + (N_{24}' \times 2^{23})$.

For all coordinates odd the first dimensional table would begin:

| Shell No (I) (1D) | $r^2$ | Number of Available Points (ignoring sign changes) ($D_1'$) | Integral Coordinates (ignoring sign changes) |
|---|---|---|---|
| 0 | 0 | 0 | none |
| 1/16 | 1 | 1 | 1 |
| 2/16 | 2 | 0 | none |
| 3/16 | 3 | 0 | none |
| 4/16 | 4 | 0 | none |
| 5/16 | 5 | 0 | none |
| 6/16 | 6 | 0 | none |
| 7/16 | 7 | 0 | none |
| 8/16 | 8 | 0 | none |
| 9/16 | 9 | 1 | 3 |
| 10/16 | 10 | 0 | none |

Application of the summing algorithm provides available points (ignoring sign changes) in 2D:

| Shell No (I or J) | $r^2$ | Number of Available Points $D_2'$ | Integral Coordinates |
|---|---|---|---|
| ½ | 4 | 1 | (1,1) |
| 2½ | 36 | 2 | (1,3)(3,1) |

It is noted that the last table is abbreviated by omitting the rows with no available points and that further application of the summing algorithm requires use of the omitted rows at ¼ unit intervals for I from 0 to n.

With this in mind tables of the vectors are built up resulting in the following tables:

| Shell No (I or J) | $R^2$ | $D_2'$ | Shell No (I or J) | $R^2$ | $D_4'$ |
|---|---|---|---|---|---|
| ½ | 2 | 1 | ½ | 4 | 1 |
| ⅝ | 10 | 2 | ¾ | 12 | 4 |
| 1¼ | 18 | 1 | 1¼ | 20 | 6 |
| 1⅝ | 26 | 2 | 1¾ | 28 | 8 |
| 2¼ | 34 | 2 | 2¼ | 36 | 13 |
| 2⅝ | 42 | 0 | 2¾ | 44 | 12 |
| 3¼ | 50 | 3 | 3¼ | 52 | 14 |
| . | . | . | . | . | . |
| . | . | . | . | . | . |
| . | . | . | . | . | . |

| Shell No (I or J) | $R^2$ | $D_8'$ | Shell No (I or J) | $R^2$ | $D_{16}'$ |
|---|---|---|---|---|---|
| ½ | 8 | 1 | 1 | 16 | 1 |
| 1 | 16 | 8 | 1½ | 24 | 16 |
| 1½ | 24 | 28 | 2 | 32 | 120 |
| 2 | 32 | 64 | 2½ | 40 | 576 |
| 2½ | 40 | 126 | 3 | 48 | 2060 |
| 3 | 48 | 224 | 3½ | 56 | 6048 |
| 3½ | 56 | 344 | 4 | 64 | 15424 |
| . | . | . | . | . | . |
| . | . | . | . | . | . |
| . | . | . | . | . | . |

| Shell No (I or J) | $R^2$ | $D_{24}'$ |
|---|---|---|
| 1½ | 24 | |
| 2 | 32 | 24 |
| 2½ | 40 | |
| 3 | 48 | 2048 |
| 3½ | 56 | |
| 4 | 64 | 48576 |
| 4½ | 72 | |

| 5 | 80 | 565248 |

The rule that the sum of "all odd" coordinates must be 4 modulo 8 may be applied by noting that only the integrally numbered shells in 24D obey this rule so that the rows for the fractional shells would be omitted from the table in use. Each point represented by $D_{24}$ may be expanded to 4096 points in accord with the patterns by changing signs wherever the corresponding pattern has a one.

It is possible to encode and decode in accord with the invention using tables constructed to employ enumerated points determined by the application of the algorithm to the Z,N' and D' pattern vectors as described above. However, it is preferred and is the form used in the preferred embodiment to be described hereafter to achieve (to a large extent) the same message point distribution by defining any value N in terms of (a) a point on the Z lattice (b) a specified Leech lattice pattern vector and (c) as having even or odd coordinates. The preferred method and means therefore, for encoding is as follows. First determine a point on the Z (origin centred) lattice and then modify the points as determined by the Leech lattice pattern assigned, and by the choice of 'even' or 'odd'. In this way the complexities involved in calculating the N' and D' vectors and the values arising therefrom, and the consequent encoding and decoding using such values is avoided. There is a slight loss of economy in power since it is found that outer points determined by using the latter (Z lattice) method do not completely fill some of the outer shells to the same extent that these shells are filled if the message points chosen using Z, N' and D' vectors. However, inward of these outer shells the points are the same by either method. (If the n shells were carried out to $N = \infty$ the same points would be determinable by both methods). The simpler means and method of encoding and decoding render the Z lattice method preferable.

Hereafter a specific embodiment will be described using K=24. It will be realized that the invention also applies to other values of K and examples will be given for K=8 and K=16.

Figure 2:
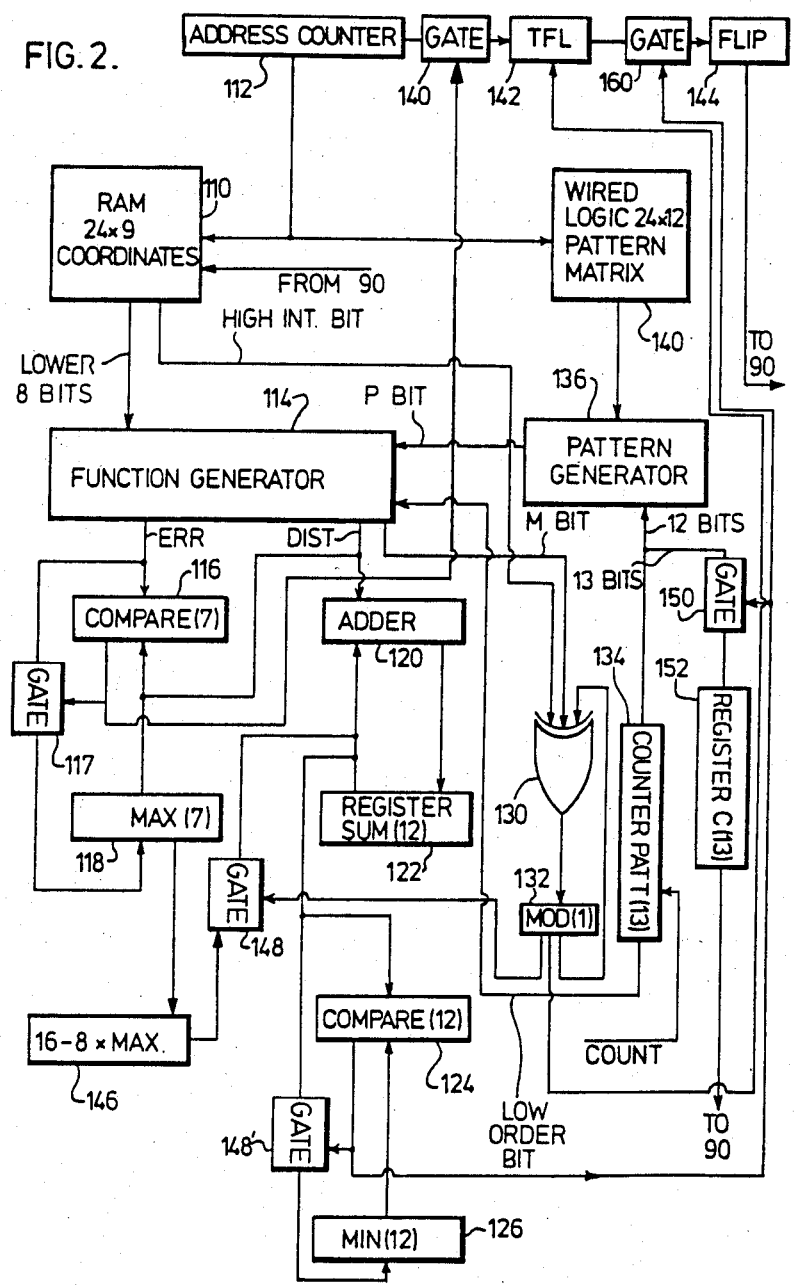
Figure 3:
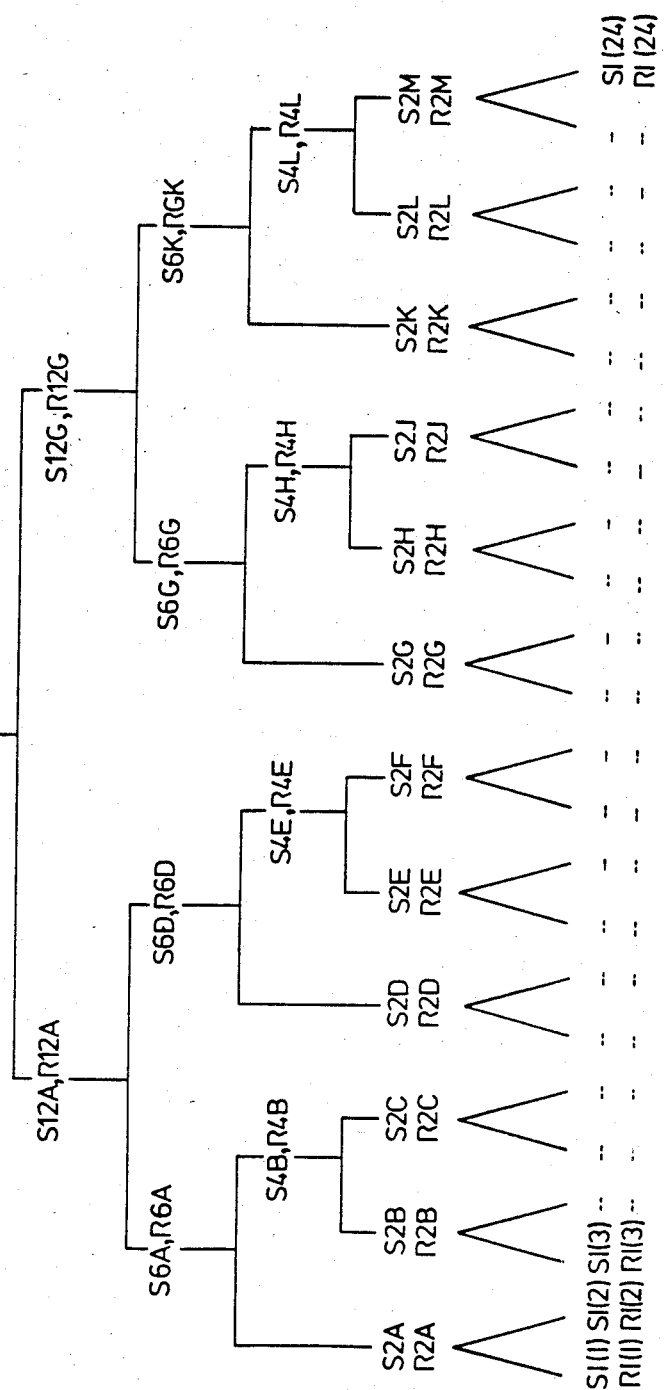

FIG. 1 shows schematically the overall circuitry employed with this invention including the program instructions and algorithms employed therewith, FIG. 2 shows circuitry for the hardware portion of the detector operation, FIG. 3 shows the relationship of sequential uses of the splitting and combining algorithm.

In the drawings FIG. 1 schematically illustrates the functional operations performed in a communications system utilizing the invention. The functional operations are not intended to imply particular hardware or choices between hardware and software modes, except in blocks 20, 80 and 90. In block 20 and block 90 the microprocessors are programmed to perform the operation indicated. In block 80 the detection is performed by circuitry designed in accord with a specific embodiment of the invention and operating in conjunction with a microprocessor. The circuitry is described in FIG. 2 and will be described hereafter. Although microprocessors are specified for use in various steps of the operation, the operation described may use any system adapted to provide the claimed means and methods. However, it should be emphasized that the speed of operation required of the detector with the speeds suggested in the encoding algorithm requires detector circuitry of the type shown in FIG. 2 or equivalent.

Thus, as functionally illustrated in FIG. 1, serial binary data in blocks of b bits is scrambled at scrambler 15 and converted at serial to parallel convertor 10 into groups of b bits. At a data rate of 19,200 bits per second the data to be transmitted in one frame consists of 96 bits to be block encoded and if an auxiliary 200 bps channel is desired 97 bits must be block encoded. At 16,800 bits per second with an auxiliary channel, blocks of 85 bits must be encoded per block and at 14,400 bits per second, 73 bits must be encoded per block.

The groups of b bits are block encoded at block 20 into the values of 24 coordinates C1, C2, . . . C24 in accord with the encoding algorithm hereinafter provided. The values of the coordinates are converted to modulating signals in coordinate signal generator 30. The outputs of coordinate signal generator 30 and carrier generator 40 are converted at modulator 45 into a carrier modulated in accord with the values C1, C2, . . . C24. The invention is independent of the method of modulation. It will usually be preferred to use Quadrature Amplitude modulation QAM wherein the signals incorporating the coordinate values are modulated in twelve pairs by conventional quadrature methods. Several other forms of modulation are available. These include but are not limited to double side band-quadrature modulation (often abbreviated DSB-QAM). DSB-QAM includes modulation techniques such as phase-shift keying PSK, quadrature amplitude modulation (QAM), already referred to, and combined amplitude and phase modulation which have long been known in the art.

The modulated carrier signals from modulator 45 are provided to transmitter interface 50 and transmitted in the interfaced form to the channel. After reception from the channel at receiver interface 60 the received signals are demodulated, conditioned and equalized at block 70, all in accord with techniques well known to those skilled in the art. The output of block 70 is provided to the detector 80 and to microprocessor 90 where by combined operation of the microprocessor and the detector the transmitted coordinates C1, C2, . . . C24 are detected in accord with the programming instructions and the circuitry of FIG. 2, to be described. The detected coordinates are provided to the decoder portion of microprocessor 90 which, in accord with the algorithm to be described converts these coordinates into the b bits of binary data which were supplied to the input of block 20 at the receiver. The reconstituted b bits are converted to serial binary data at convertor 100. The above cycle involving the encoding of b bits into 24 coordinate signals and resultant detection and decoding at the receiver will customarily be performed (at each end of the channel) 200 times per second, with the signalling speed in bits per second of bits b being determined by the number of bits b which are block encoded to correspond to each 24 coordinates. Circuitry for performing the functions described excepting those of blocks 20, 80 and 90 is well known to those skilled in the art.

It is now proposed to describe the operation of the encoder 20, the description to be read with the encoding algorithm appearing hereafter.

In the encoder 20 the b bits are to be encoded as a block of 24 coordinates so that dimension K=24. Since a Leech pattern matrix is to be used, there are 4096 pattern vectors which may be constructed therefrom by adding any combination of rows (including no rows) coordinate by coordinate modulo 2. The pattern matrix shown is not the classical form but is derived therefrom where each row of the pattern matrix is derived from a different combination (added coordinate by coordinate modulo 2) of the rows of the classical form including the corresponding row. The conventional Leech Matrix is shown below:

| Row No. | |
|---|---|
| 1 | 100000000000111111111111 |
| 2 | 010000000000110100011101 |
| 3 | 001000000000101000111011 |
| 4 | 000100000000110011110110 |
| 5 | 000010000000100111101101 |
| 6 | 000001000000100111011010 |
| 7 | 000000100000101110110100 |
| 8 | 000000010000111101101000 |
| 9 | 000000001000111011010001 |
| 10 | 000000000100110110100011 |
| 11 | 000000000010101101000111 |
| 12 | 000000000001111010001110 |

However, a variation of the conventional matrix called the 'Pattern Matrix' is preferred for convenience because it requires no more than 5 '1's per column, simplifying the logic and the power demands. It should be made clear that the Conventional Leech Matrix and the modified Leech Matrix, the latter referred to as the 'Pattern Matrix', both yield the same 4096 pattern vectors. The combination of the Pattern Matrix containing zero rows and consisting of values which are 24 zeros, defines the centre of a lattice of coordinate points whose coordinates are all 0 modulo 4, called the Z lattice discussed hereafter.

In relation to the use of the Leech Matrix or the Pattern Matrix, it is important to note that the columns may be interchanged freely and to any extent without losing any of the 'packing' advantages and without reducing the applicability of the encoding and decoding techniques advanced herein. Obviously the same column arrangement must form the basis of the encoding and decoding steps.

(It may here be noted that the interchangeability of columns in a Leech Matrix is merely one aspect of a more general rule that the coordinates of an orthogonal system may be interchanged freely as long as the interchanged order is maintained. Thus although coordinates in three dimensions are customarily written in the order (X, Y, Z,) they may be written (Z, X, Y,) (Z, Y, X,) or in any other sequence as long as the sequence is maintained throughout the calculations. Where alternate lattices are available for coordinate selection the lattice columns may be interchanged since this will effect the interchange of coordinate order and the results will be the same as long as the interchanged column order is maintained throughout the use or calculations).

Since the Pattern Matrix provides 4096 pattern vectors and each of these patterns may be even or odd, the number N which identifies the bit sequence in the block of b bits is divided by 8192 to provide a quotient M and a remainder C. The quotient M will be encoded to 24 coordinates on the Z lattice and, after such encoding, the coordinates will be modified in accord with the selected pattern vector and the choice of even or odd coordinates, both being determined by the number C. (It will be noted that if K the dimension were another value than 24 (say 8) which does not have alternate pattern vectors, then the number N would be encoded into K coordinates without prior division or, in some cases with division only by 2 to allow for the choice of even or odd coordinates.

In the encoding algorithm of the embodiment Z tables are provided for dimension 1, 2, 4, 6, 12 and 24. Each dimension table, called Z1, Z2, Z4, etc., tabulates for shell number the number of points which satisfy the coordinate rules (the coordinate modulo sum rules are not considered except in 24 dimension). The shell number in each table is 1/16 the square of the radius ($r^2$) measured from the origin, in the dimension being considered, to each of the set of coordinates making up the entry for that shell number. The value of 1/16 is derived from the fact that each coordinate value is separated from the next value by four units (in accord with the modulo rules for the coordinates as distinct from the rules for the coordinate sum) so that the coordinates of a point, in whatever dimension, will occur at some of the steps $r^2=0$, 16, 32, 48 etc., from the origin.

Each Z table is constructed from the next in accord with the combining algorithm $$V_{H,n} = \sum_{I=0}^{I=n} V_{F,I} X V_{G,n-I}$$

(where H, F and G are dimensions and F+G=H) for unit steps of I. This is worth noting since the splitting algorithm used to determine the coordinates corresponding to a number M is based on the structure of the above algorithm used to make the tables. The Z24 table which is the basis for the 'Offset Table' used with the encode, detect, decode algorithms, does not include the values for the odd shell numbers, which the above algorithm would provide, since such the coordinates of points on such odd numbered shells will not satisfy the 0 modulo 8 requirements of the coordinate sum 24 dimensions (all even coordinates) and use of the Leech lattice. The Offset Table provides, for each even shell number, the total number of points on the previous shells in the sequence defined by the shell table. By locating the Offset Table entry with the highest value not exceeding M the shell is identified where the message point represented by M will be located and the value M less the Offset table value, gives a value D (otherwise referred to as $X_{24}$) which identifies the point on the selected shell. By use of the splitting algorithm forming part of the encoding algorithm the value D which identifies a point on the selected 24 dimensional shell is used to derive first number $X_{12(F)}$ on a first 12D shell and a second number $X_{12(G)}$ on a second 12D shell. Continued use of the splitting algorithm as described in the encoding algorithm and will eventually derive 24 selected one dimensional shell numbers and for each an accompanying value which will be 0 or 1. Each of the Z lattice coordinates may be derived from the one dimensional shell number by taking the square root of the shell number and multiplying by 4. (It will readily be appreciated that one dimensional coordinate values could have been used throughout instead of the shell number, thus avoiding the last computation. However it is, at least conceptually, easier to use shell numbers.) The 24 derived Z lattice coordinates define a point on the Z lattice defining quotient M. The coordinates are then modified to take into account the value C. Even or odd coordinates are selected in accord with whether C is even or odd. The 12 higher order binary places of C define a number from 0 to 4095 which is used to select one of the 4096 pattern vectors. The coordinates are then modified as follows: (1) If C is odd, subtract 3 from the first of the 24 lattice point coordinates if the first bit of the pattern vector is a zero or add 3 if it is a one. For the remaining 23 Z lattice point coordinates add 1 if the corresponding pattern bit is a zero or subtract one if it is a one. It will be obvious that any coordinate could have been varied by 3 instead of the first although using the first is easier for programming purposes. It will further be obvious that the roles of the ones and zeros in the pattern vector may be reversed. (2) If C is even add 2 to each Z point lattice point coordinate for which the corresponding pattern vector is a one. It will also be realized that the roles of the ones and zeros can be reversed with the even C pattern vector. It will of course be obvious that such alterations in the encode program will require corresponding changes in the decode program.

In the encode algorithm which follows "S" stands for "shell" number. In such algorithm two shell numbers are involved I is one of these and J is the other. In tables Z1, Z2, Z4, Z6, Z12, the number on the left is the shell number and the number on the right is the number of available points in that shell noting that in the Z lattice the coordinates are all 0 modulo 4. In the offset table the shell number is the left column and the number in the right column is the total number of available points in the shells preceding the row in question. The total number of available points is limited to those satisfying the coordinate requirements and the modulo requirements for the coordinate sum in the offset table.

The principle of the splitting algorithm, as used in steps 4–26 of the encoding algorithm may be demonstrated by FIG. 3. A point defined as number D on a shell S24 in 24 space may be also defined by number R12A on shell S12A in 12 dimensional space together with number R12G shell S12G in 12 dimensional space. Each number and shell in 12 dimensional space may be identified by a pair of number and shell combinations in 6 dimensional space, and so on.

It will thus be seen that when in accord with the encoding algorithm the entry in the offset table is located with the largest offset number less than M, then the shell on which the point corresponding to D (equivalent to $X_{24}$) has been found and the value D=M−the offset number identifies a point on the shell, and the combination of shell number and D identify the number M.

The splitting algorithm described is then used to sequentially replace each combination of a shell number and a number identifying a point on the shell, in a dimension H, with two combinations of shell number and a point identifying number in dimensions F and G where $F+G=H$. This process is continued with $F=G=1$ hereby the coordinates and their signs can be identified. The 'tree' of operations of the splitting algorithm is indicated by downward travel in FIG. 3.

In the encoding algorithm to follow the following points are noted. The algorithm relates to signalling using 24 message point coordinates. Since there are 4096 lattice centres and each may be used with 24 coordinates with the choice of making them all even or all odd the number N identifying the bit sequence in a block of b bits is divided by 8192 producing a quotient M and a remainder or coset point C. The designation D ($X_{24}$) refers to the general discussion where '$X_K$' designates a point on a shell in K space and the designation D is used for $X_{24}$ in the algorithm to follow.

Further in the encode, detection and decode algorithms used herein the symbol '*' represents the multiplication operation or 'x'.

It will be noted, that in step 4 of the splitting algorithm 'X' is divided "by entry I of table A". It will be appreciated that what is happening here is that the number X to be assigned to two shells is being divided by entry I representing the first assigned shell's capacity of available points, to obtain a quotient Q to be assigned to the second assigned shell and a remainder (R) to be assigned to the first assigned shell. Obviously the roles can be reversed and division may be performed by the entry for the second shell to obtain a quotient to be assigned to the first and a remainder to the second. This is equivalent to the procedure outlined if a corresponding complementary operation is performed at the decoder.

Also it will be noted that the sequence of shells represented by the offset table need not be in the order of rising shell number although this appears the most convenient for programming. However, the tables Z1-Z12 should be in order of rising shell number for convenience and simplicity in programming.

The choice of even or odd coordinates, together with the selection of pattern vectors all having determined the coordinates C1, C2, ... C24 by the encoding algorithm these are provided by the microprocessor encoder 20 to the coordinate signal generator 30 which generates modulating signals in accord with the coordinate values. The modulating signals from coordinate generator are modulated on the carrier at modulator 45, to provide the modulated carrier signal to the transmitter channel interface 50. The type of modulation used is not limited by the invention and may be any of a large number of types as previously discussed. Most commonly QAM (quadrature amplitude modulation) will be used.

The signal transmitted from the transmitter channel interface 50 on the channel is received at the receiver channel interface 60. The signals received are subjected to conditioning, demodulation an equalization at block 70, all blocks 15, 10, 30, 40, 45, 50, 60, 70, 100 and 95 being designed and operated in accord with techniques well known to those skilled in the art.

The conditioned, demodulated and equalized signals having the values C1-½, C2-½ ... C24-½ is supplied to the detector 80 shown in FIG. 2 and described in the programming instructions and also to microprocessor detector and decoder 90.

The description of FIG. 2 should be considered in combination with the detection algorithms to follow. The detection algorithm to follow describes the operation of the circuitry of FIG. 2 and in associated microprocessor 90.

In FIG. 2 the values of coordinates C1, C2, ... C24 after demodulation are stored in microprocessor 90 the ½ value being added to the demodulated values as called for by step 1 of the detection algorithm. In each cycle a portion of each of the 24 coordinates is supplied by microprocessor 90 to random access memory (RAM) 110. The portion of each coordinate supplied is the low order 3 bits of the integral value of the coordinate and the high order 6 bits of its fractional portion. Only the low order 3 bits of the integral value are required since for purposes of the circuitry of FIG. 2 since the value of each coordinate need only be known modulo 8. The full value of each coordinate is, however, retained by the microprocessor 90 for use during the detection process.

In the description of FIG. 2 to follow, the paths for and origins of the clock signals to produce operation of the circuit in the sequence described, are omitted. It will be understood that, given the circuit shown the necessary clocking signals to achieve the functions discussed is well within the competence of one skilled in the art.

The address counter 112 counts cyclically from 1 to 24, corresponding to the 24 operations in each cycle of steps 8 to 12 of the detection algorithm. At each count, that is for each coordinate position the counter 112 causes, for the corresponding coordinate, the transfer of the 2 lower integral and 6 fractional bits from RAM 110 to function generator 114 and the highest integral bit to gate 130. At pattern matrix 140, counter 112 causes for each coordinate the corresponding column of the pattern matrix to be sequentially ANDed row by row with corresponding bit positions going left to right of the 12 higher order bits of PATT from counter 134. The pattern generator 136 then sends to the function generator the even parity bit (P BIT) of the result of the ending operation. An example should be given:

| | |
|---|---|
| Column 4 of pattern matrix Top to Bottom | 001100100110 |
| Counter 134 (e.g.) | 010101010101 |
| Result of ANDing place by place | 000100000100 |
| Total of ANDing (mod 2) | 0 |
| P Bit | 0 |

It will thus be seen that the ANDing operation results in the selection for modulo 2 addition of the bits in those positions of the appropriate column which are selected by the 12 high order bits of counter 134. The parity bit of the total of the ANDing produces the modulo 2 results of the selection. The parity bit or P Bit is supplied, for each coordinate, to function generator 114 for use as described.

The function generator 114 is clocked for each coordinate and receives the coordinate value mod 4 from RAM 110, and corresponding one or zero (PBIT) from the pattern generator 136, and the 'even' or 'odd' signal from 13 bit counter 134. The pattern generator 136 generates a one bit variable for each coordinate calculation cycle. One column of the pattern matrix (set out in the detection algorithm) stored in ROM 140 preferably a wired logic pattern matrix corresponds to each coordinate. Thus, at function generator 114, for each coordinate calculation cycle, values of ERR, DIST and MBIT are generated as a function of PBIT, 'odd' or 'even' (determined by the low order bit of PATT) and the integral value mod 4 received from RAM 110, and also utilized in the results of table (step 8) are the fractional value of the coordinate from RAM 110. The function generator 114 is designed and constructed to determine: (see table of step 8 of the detection algorithm).

ERR—the minimum distance between the coordinate value modulo 4 and a mod 4 value determined by PBIT and 'odd' or 'even'. Note that F is the 6 bit fractional part and $\sim$F is its ones complement. $\sim$F has been used in place of 1−F introducing a one bit error in the lowest place, but the computation is greatly simplified.

DIST which is equal to $ERR^2 - F^2 + 1$ is a measure of the square of the error and is used in obtaining the sum of such measures for the 24 coordinates at summer 122.

MBIT which is used in calculating over the 24 coordinates whether the sum of the coordinates is 0 modulo 8. MBIT is 1 anywhere that the values of I1 and I0 round to 4 rather than 0.

The DIST output of function generator 114 for each coordinate in a row is added to the value already in 'SUM' register 122 until the register 122 contains the 'SUM' of 'DIST' for the 24 coordinates. (see step 9 of the algorithm).

Exclusive OR gate 130 for each coordinate receives three inputs being: the highest order integral bit from RAM 110, the MBIT from function generator 114 and the prior value (1 or 0) in one bit register "MOD" 132. The MOD value at the end of the 24 coordinate calculations indicates whether the sum of the coordinates is 4 or 0 modulo 8, corresponding respectively to a 1 or 0 in MOD at the end of the coordinate calculations.

For each coordinate value the value ERR is supplied to comparator 116. Here it is compared with the value MAX stored in register 118. When ERR>MAX comparator 116 is designed to open gate 117 to cause a transfer of ERR as the new value of MAX. MAX is initially set to 0 so that first ERR value will always be set in MAX. When a new value is set in MAX comparator 116 also sends a signal to gate 140. Gate 140 then allows the transfer of the coordinate number from address counter 112 to register 142 TFL.

The components as shown and described and complete a cycle for each of 24 coordinates as described in steps 8 to 12 of the algorithm for each performance of steps 4–15.

Steps 4–15 (which include 24 performances of 8–12) are performed 8192 times for each set of coordinates detected.

If at the end of any step 12, MOD=1 it is an indication that the coordinates sum does not satisfy the modulo rules and that coordinate with the largest error should be altered to that coordinate next nearest to the one utilized in table 1. The resultant increase in SUM is provided by calculating the value 16−8x MAX (see block 146) and block 132 opens gate 148 to cause, through adder 120, the increase in the sum at register 122. If MOD=0 at the end of any step 12 TFL is reset to 0 (Step 13).

After the calculation of the SUM for each comparison of 24 coordinates, the value is provided to comparator 124 where it is compared with the value MIN in register 126. If the SUM<MIN then comparator 124 is designed to open gate 148′ to place the value of SUM in register 126 as the new MIN. The result of the updating of MIN over the 8192 cycles of steps 4–15 will result in the final value of MIN being the minimum SUM of the 8192 comparisons. Further, each time SUM is less than MIN a signal from comparator 124 opens gate 150 to cause storage of the corresponding number from counter 134 in register 152 (value C in the algorithm). It will be noted that counter 134 supplies the 13 bits to the register 152 but only the 12 higher order bits are supplied to pattern generator 136.

At the end of the 8192 operations the register 152 will contain the number identifying the pattern corresponding to the minimum SUM for the 8192 operation.

It will be noted that for each maximum error in a coordinate, the number of that coordinate will be loaded in block TFL. TFL is set to 0 when MOD (i.e. the output of block 132) is 0, indicating that the modulo value of the sum of the coordinates as correct. When MOD=1 the addition to SUM from block 146 corrects SUM to take into account that the 'decision' coordinate for the maximum error coordinate position will not be the closest but rather the second closest permissible coordinate value. That is, if the modulo value of the sum of the coordinates is not correct, the decision is made to alter the coordinate with the maximum error (stored in TFL) to the next permissable coordinate value to correct coordinate sum. Whenever the SUM is less than MIN at comparator 124, the value of TFL is loaded into register 144 'FLIP' under control of gate 160, which is, in turn, under the control of comparator 124. The position of the pattern vector giving rise to the minimum SUM is recorded in register 152 through gate 150 controlled by comparator 124 and (if the corresponding MOD in register 132 was 1) the location of the coordinate in such pattern vector having the worst error relative to the received signal coordinate, is stored in FLIP for later use by the microprocessor 90. If the modulo sum was correct for the worst coordinate in the selected pattern vector the value of FLIP will be zero.

In line with previous remarks it will be noted that the detection system is unaltered if columns of the pattern matrix and the corresponding coordinates are interchanged in any desired way as long as the interchanged results correspond to those at the encoder and decoder.

The components of the circuitry of FIG. 2 are customarily performed on 2 microchips. The RAM 110 is contained on one microchip and the remaining components of FIG. 2 are contained on the other. The microchips are manufactured by Motorola Inc. of 1303 East Algonquin Road, Schaumberg, Ill.

The pattern being identified by the number C in register 152 it is used, outside the chip and in the microprocessor 90 to complete the detection process. The twelve high order bits in C will be used in the microprocessor to develop the pattern vector (which controlled the modification of the Z lattice coordinates in Step 29 of the encoding algorithm).

In step 17 of the detection algorithm the pattern vector identification embodied by the 12 higher order bits of C registered in register 152 are used to identify those rows of the matrix which are to be added, coordinate by coordinate modulo 2, to obtain the pattern vector. The process mathematically corresponds to that performed in hardware on the chip of FIG. 2 at pattern generator 136 to develop the P bit (which constitutes successive values of the pattern vector).

The steps 17 to 21 of the detection algorithm are obvious complements of the encoding steps in the encoding algorithm. It will be noted that the determination of whether C is even or odd is determined by the low order bit of C.

In considering steps 18 and 19 of the detection algorithm it will be noted that the full value of the coordinate is used instead of the only the lower 3 integral values as used by the circuit of FIG. 2. This may be best illustrated by an example. If a coordinate value received and stored in microprocessor 90 was 124.125 or 1111100.001000 then only the lower order 9 bits or 100.001000 were sent to RAM 110. However, the full value of the coordinate is used in steps 18 and 19 of the detection algorithm.

Further it will be noted that the coordinate values stored in microprocessor 90 after detection algorithm, step 1, (adding ½ to each coordinate) represent the detected values of transmitted coordinates C1, C2, ... C24.

It will be further noted that where a negative coordinate value is received and stored in microprocessor 90, the bits sent to RAM 110 are modulo 8 of the true negative value not of the absolute value.

Step 20 shows the use of the value FLIP. If a coordinate number is stored in FLIP register 144 at the end of the 8192 comparisons, the modulo sum of the coordinates was incorrect for the selected pattern vector. Accordingly, the value of the 'worst' error coordinate, identified in FLIP is altered to the next closest value as directed in step 20 to correct the modulo sum.

In the decoding algorithm the 1D Z lattice points S1(1), R1(1); S1(2) R1(2) . . . S1(24) R1(24) are combined by the combining algorithms to determine the encoded number Z. The combining algorithm reverses each of the steps of the splitting algorithm. The combining algorithm is further used to reverse the dimensional steps represented by the tree of FIG. 3 to produce the value D,S24 from the 24 S1, R1 values.

With regard to the combining algorithm, it will be noted that in the splitting algorithm (dimension H=dimensions F+G) entries for $$\sum_{i=0}^{k} I_i \times J_{n-i}$$

(n is the shell of H while I and J are the entries for the corresponding shell no), were performed with successive subtractions from $X_H$ until $I_k \times J_{n-k}$ > last X. The entry for $I_k$ was then divided into the last X to produce quotient Q and remainder R.

In the exact converse, in the combining algorithm, $I_k$ is multiplied by the quotient Q and R is added to produce the "last X" of the splitting algorithm. The first X of the splitting algorithm is provided from the last X in the combination algorithm by adding the products of the entries for $I_{k-i} \times J_{n-k+l}$ until k−i=0. The result of the combining algorithm is to produce the number $X_H$ and the shell number in dimension H having started with two pairs of values $X_F$ and shell no in dimension F and, $X_G$ and shell no in dimension G.

It will readily be appreciated that at step 25 of the decoding algorithm the shell number gives the offset value for addition to D, to give the encoded sum Z. Z is multiplied by 8192 reversing the division at the encoder. When C is to be added, it will be noted that the value C was obtained by the microprocessor 90 from register 152.

The value N is then transmitted as b bits from microprocessor 90 to parallel to series convertor 100 where it is converted to serial binary bits. Assuming that scrambling was performed at scrambler 15 then the serial binary bits are unscrambled at uncrambler 95 into unscrambled serial binary bits of serial binary data.

In considering the encoding, detection and decoding algorithms the following points should be noted.

Although this application gives only one tabulation is of the pattern matrix, the offset table and tables Z1–Z12; it will be obvious that such tables exist both in the microprocessor 20 at the transmitter end of the channel for use with the encoding algorithm and in the microprocessor 90 at the receiver end of the channel for use with decoding algorithm.

It will be noted that $X_K$ in the general approach to the invention identifies a message point or a shell in K dimensions. $X_{24}$ thus identifies a message point or a shell in 24 dimensions. $X_{24}$ corresponds to D in step 3 of the encoding algorithm and step 24 of the decoding algorithm.

In accord with general remarks made previously it will be noted that the encoding and detection and decoding steps are unchanged and that the overall process remains the same if the columns is the 'pattern matrix' are interchanged as long as the same column arrangement is used in the encoder and decoder.

The encoding, detection and decoding algorithms are set out below:

ENCODING ALGORITHM

At a data rate of 19,200 bits per second, the data to be transmitted in one frame consists of 96 bits which may be considered as a number, N, in the range from 0 to 79,228,162,514,264,337,593,543,950,335. If an auxiliary 200 bps channel is desired, the number of bits is increased to 97 so that N is from 0 to 158,456,325,028,528,675,187,087,900,671. At 16,800 bits per second with an auxiliary channel, only 85 bits are required which may be considered as a number, N, in the range from 0 to 38,685,626,227,668,133,590,597,631. Similarly, at 14,400 bits per second, only 73 bits are required which may be considered as a number, N, in the range from 0 to 9,444,732,965,739,290,427,391. The number, N, may be converted to a group of 24 coordinates to be transmitted by the following algorithm.

Step 1: Divide N by 8192. Let the quotient be M and the remainder be C. M will now be encoded into a point in the Z lattice and C will be used to select a coset point.

Step 2: Scan the offset table (table 1) to find the entry for which the value in the offset column is as large as possible but does not exceed M. Let S be the corresponding shell number.

Step 3: Subtract the value in the offset column from Z giving a difference D. So far we have selected a shell corresponding to the table entry and we will use the value of D to select a message point from within this shell.

Step 4: Set X=D and J=S. Then use the splitting algorithm (described later) with Table A=table Z12 and Table B=table Z12. Let S12A=I, S12G=J, R12A=R and R12G=Q Step 5: Set X=R12A and J=S12A. Then use the splitting algorithm with Table A=table Z6 and Table B=table Z6. Let S6A=I, S6D=J, R6A=R and R6D=Q Step 6: Set X=R12G and J=S12G. Then use the splitting algorithm with Table A=table Z6 and Table B=table Z6. Let S6G=I, S6K=J, R6G=R and R6K=Q Step 7: Set X=R6A and J=S6A. Then use the splitting algorithm with Table A=table Z2 and Table B=table Z4. Let S2A=I, S4B=J, R2A=R and R4B=Q Step 8: Set X=R4B and J=S4B. Then use the splitting algorithm with Table A=table Z2 and Table B=table Z2. Let S2B=I, S2C=J, R2B=R and R2C=Q Step 9: Set X=R6D and J=S6D. Then use the splitting algorithm with Table A=table Z2 and Table B=table Z4. Let S2D=I, S4E=J, R2D=R and R4E=Q Step 10: Set X=R4E and J=S4E. Then use the splitting algorithm with Table A=table Z2 and Table B=table Z2. Let S2E=I, S2F=J, R2E=R and R2F=Q Step 11: Set X=R6G and J=S6G. Then use the splitting algorithm with Table A=table Z2 and Table B=table Z4. Let S2G=I, S4H=J, R2G=R and R4H=Q Step 12: Set X=R4H and J=S4H. Then use the splitting algorithm with Table A=table Z2 and Table B=table Z2. Let S2H=I, S2J=J, R2H=R and R2J=Q Step 13: Set X=R6K and J=S6K. Then use the splitting algorithm with Table A=table Z2 and Table B=table Z4. Let S2K=I, S4L=J, R2K=R and R4L=Q Step 14: Set X=R4L and J=S4L. Then use the splitting algorithm with Table A=table Z2 and Table B=table Z2. Let S2L=I, S2M=J, R2L=R and R2M=Q Step 15: Set X=R2A and J=S2A. Then use the splitting algorithm with Table A=table Z1 and Table B=table Z1. Let S1(1)=I, S1(2)=J, R1(1)=R and R1(2)=Q Step 16: Set X=R2B and J=S2B. Then use the splitting algorithm with Table A=table Z1 and Table B=table Z1. Let S1(3)=I, S1(4)=J, R1(3)=R and R1(4)=Q Step 17: Set X=R2C and J=S2C. Then use the splitting algorithm with Table A=table Z1 and Table B=table Z1. Let S1(5)=I, Si(6)=J, R1(5)=R and R1(6)=Q Step 18: Set X=R2D and J=S2D. Then use the splitting algorithm with Table A=table Z1 and Table B=table Z1. Let S1(7)=I, S1(8)=J, R1(7)=R and R1(8)=Q Step 19: Set X=R2E and J=S2E. Then use the splitting algorithm with Table A=table Z1 and Table B=table Z1. Let S1(9)=I, S1(10)=J, R1(9)=R and R1(10)=Q Step 20: Set X=R2F and J=S2F. Then use the splitting algorithm with Table A=table Z1 and Table B=table Z1. Let S1(11)=I, S1(12)=J, R1(11)=R and R1(12)=Q Step 21: Set X=R2G and J=S2G. Then use the splitting algorithm with Table A=table Z1 and Table B=table Z1. Let S1(13)=I, S1(14)=J, R1(13)=R and R1(14)=Q Step 22: Set X=R2H and J=S2H. Then use the splitting algorithm with Table A=table Z1 and Table B=table Z1. Let S1(15)=I, S1(16)=J, R1(15)=R and R1(16)=Q Step 23: Set X=R2J and J=S2J. Then use the splitting algorithm with Table A=table Z1 and Table B=table Z1. Let S1(17)=I, S1(18)=J, R1(17)=R and R1(18)=Q Step 24: Set X=R2K and J=S2K. Then use the splitting algorithm with Table A=table Z1 and Table B=table Z1. Let S1(19)=I, S1(20)=J, R1(19)=R and R1(20)=Q Step 25: Set X=R2L and J=S2L. Then use the splitting algorithm with Table A=table Z1 and Table B=table Z1. Let S1(21)=I, S1(22)=J, R1(21)=R and R1(22)=Q Step 26: Set X=R2M and J=S2M. Then use the splitting algorithm with Table A=table Z1 and Table B=table Z1. Let S1(23)=I, S1(24)=J, R1(23)=R and R1(24)=Q Step 27: Generate the 24 coordinates of the Z lattice point from S1(1) to S1(24) and R1(1) to R(1)24. Each coordinate is 4 times the square root of the corresponding S1(n). If R(1)n=1, the sign of the coordinate is to be made negative.

Step 28: The 12 high order bits of the 13 bit binary representation of C are associated with the twelve rows of the pattern matrix with the most significant bit associated with the first row.

Step 29: Exclusive or together those rows of the matrix for which the associated bit of C is a one to produce a "pattern vector" of 24 bits.

Step 30: If C is even, add 2 to each Z lattice point coordinate for which the corresponding pattern vector bit is a one.

Step 31: If C is odd, subtract 3 from the first Z lattice point coordinate if the first bit of the pattern vector is a zero or add 3 if it is a one. For the remaining 23 Z lattice point coordinates, add 1 if the corresponding pattern bit is a zero or subtract one if it is a one. (Coordinates C1, C2 . . . C24 have now been produced in accord with step 30 or 31.)

Step 32: Subtract ½ from each coordinate to remove the statistical bias introduced in step 30. The coordinates are now ready for transmission.

The splitting algorithm invoked above is as follows:

Step 1: Set I=0.

Step 2: Multiply entry I of table A by entry J of table B to produce a product, P.

Step 3: If P is less than or equal to X, Subtract P from X (the difference is a new X). Add 1 to I, Subtract 1 from J and return to step 2. If P is greater than X, continue to step 4.

Step 4: Divide last X by last entry I of table A to produce a quotient, Q and a remainder R. The splitting algorithm is now complete.

DETECTION ALGORITHM

Step 1: Add ½ to each coordinate to compensate for the subtraction performed in the transmitter. (This produces the detected values coordinates C1, C2 . . . C24.)

Step 2: Initialize outer loop—Set MIN=large number.

Step 3: Perform steps 4 to 15 8192 times, once for each value of PATT from 0 to 8191.

Step 4: The 12 high order bits of the 13 bit binary representation of PATT are respectively associated with the twelve rows of the pattern matrix with the most significant bit associated with the first row.

Step 5: Exclusive or together those rows of the matrix for which the associated bit of PATT is a one to produce a "pattern vector" of 24 bits.

Step 6: Initialize inner loop—Set SUM=0. If PATT is even, set MOD=0. If PATT is odd, set MOD=1

Step 7: Perform steps 8 to 12 24 times, once for each of the 24 coordinates. Each coordinate has an integer part, I, and a fractional part, F. The three low order bits of the binary representation of I will be referred to as I2, I1 and I0. The symbol $\sim F$ will be used to mean $1-F$ which, with only a small error, can be taken as the ones complement of F.

Step 8: Use the values of PATT (whether it is odd or even), PBIT, (the bit of the pattern vector associated with this coordinate), I1 and I0 to select a line from the following table.

| PBIT. | PATT. | I1 | I0 | ERR | DIST | MBIT |
|---|---|---|---|---|---|---|
| 0 | even | 0 | 0 | F | 1 | 0 |
| 0 | even | 0 | 1 | 1+F | 2+2F | 0 |
| 0 | even | 1 | 0 | 1+~F | 1+4*~F | 1 |
| 0 | even | 1 | 1 | ~F | 2*~F | 1 |
| 0 | odd | 0 | 0 | ~F | 2*~F | 0 |
| 0 | odd | 0 | 1 | F | 1 | 0 |
| 0 | odd | 1 | 0 | 1+F | 2+2F | 0 |
| 0 | odd | 1 | 1 | 1+~F | 1+4*~F | 1 |
| 1 | even | 0 | 0 | 1+~F | 1+4*~F | 0 |
| 1 | even | 0 | 1 | ~F | 2*~F | 0 |
| 1 | even | 1 | 0 | F | 1 | 0 |
| 1 | even | 1 | 1 | 1+F | 2+2F | 0 |
| 1 | odd | 0 | 0 | 1+F | 2+2F | 0 |
| 1 | odd | 0 | 1 | 1+~F | 1+4*~F | 1 |
| 1 | odd | 1 | 0 | ~F | 2*~F | 1 |
| 1 | odd | 1 | 1 | F | 1 | 1 |

Step 9: Add the value in the DIST column to SUM.

Step 10: Exclusive or MOD, I2 and the value in the MBIT column and replace MOD with the result.

Step 11: If the value in the ERR column is greater than MAX or if this is the first coordinate, set MAX=ERR and TFL=coordinate number.

Step 12: If all coordinates have not been processed, return to step 8. Otherwise continue to step 13.

Step 13: If MOD=1, add 16−8*MAX to SUM. If MOD=0, set TFL=0.

Step 14: If SUM is less than MIN, replace MIN with SUM, set C=PATT and set FLIP=TFL.

Step 15: If all 8192 values of PATT have not been processed, return to step 4, otherwise continue to step 16.

Step 16: The 12 high order bits of the 13 bit binary representation of C are associated with the twelve rows of the pattern matrix with the most significant bit associated with the first row.

Step 17: Exclusive or together those rows of the matrix for which the associated bit of C is a one to produce a "pattern vector" of 24 bits.

Step 18: If C is even, subtract 2 from each detected coordinate C1, C2 . . . C24 for which the corresponding pattern vector bit is a one.

Step 19: If C is odd, add 3 to the first detected coordinate C1 if the first bit of the pattern vector is a zero or subtract 3 if it is a one. For the remaining 23 detected coordinates C2, C3 . . . C24, subtract 1 if the corresponding pattern bit is a zero or add 1 if it is a one.

Step 20: If FLIP=0, ignore this step. Otherwise the detected coordinate identified by FLIP must be increased by 4 if it's integer part is 0 or 1 mod 4, or decreased by 4 if it is 2 or 3 mod 4.

Step 21: Round each coordinate to the nearest 0 mod 4 value. A coordinate which is exactly 2 mod 4 should be rounded up. The 24 coordinates are now those of the Z lattice point.

DECODING ALGORITHM

Step 1: Generate S1(1) to S1(24) and R1(1) to R1(1)24 from the 24 coordinates of the Z lattice point. Divide each coordinate by 4 and square the result to produce the corresponding S value. Set each R=0 if the corresponding coordinate is positive or zero and set R=1 if it is negative.

Step 2: Set I=S1(1), J=S1(2), R=R1(1) and Q=R(1)2. Then use the combining algorithm (described later) with Table A=table Z1 and Table B=table Z1. Let R2A=X and S2A=J Step 3: Set I=S1(3), J=S1(4), R=R(1)3 and Q=R(1)4. Then use the combining algorithm with Table A=table Z1 and Table B=table Z1. Let R2B=X and S2B=J Step 4: Set I=S1(5), J=S1(6), R=R(1)5 and Q=R1(6). Then use the combining algorithm with Table A=table Z1 and Table B=table Z1. Let R2C=X and S2C=J Step 5: Set I=S1(7), J=S1(8), R=R1(7) and Q=R1(8). Then use the combining algorithm with Table A=table Z1 and Table B=table Z1. Let R2D=X and S2D=J Step 6: Set I=S1(9), J=S1(10), R=R1(9) and Q=R1(10). Then use the combining algorithm with Table A=table Z1 and Table B=table Z1. Let R2E=X and S2E=J Step 7: Set I=S1(11), J=S1(12), R=R1(11) and Q=R1(12). Then use the combining algorithm with Table A=table Z1 and Table B=table Z1. Let R2F=X and S2F=J Step 8: Set I=S1(13), J=S1(14), R=R1(13) and Q=R1(14). Then use the combining algorithm with Table A=table Z1 and Table B=table Z1. Let R2G=X and S2G=J Step 9: Set I=S1(15), J=S1(16), R=R1(15) and Q=R1(16). Then use the combining algorithm with Table A=table Z1 and Table B=table Z1. Let R2H=X and S2H=J Step 10: Set I=S1(17), J=S1(18), R=R1(17) and Q=R1(18). Then use the combining algorithm with Table A=table Z1 and Table B=table Z1. Let R2J=X and S2J=J Step 11: Set I=S1(19), J=S1(20), R=R1(19) and Q=R1(20). Then use the combining algorithm with Table A=table Z1 and Table B=table Z1. Let R2K=X and S2K=J Step 12: Set I=S1(21), J=S1(22), R=R1(21) and Q=R1(22). Then use the combining algorithm with Table A=table Z1 and Table B=table Z1. Let R2L=X and S2L=J Step 13: Set I=S1(23), J=S1(24), R=R1(23) and Q=R1(24). Then use the combining algorithm with Table A=table Z1 and Table B=table Z1. Let R2M=X and S2M=J Step 14: Set I=S2B, J=S2C, R=R2B and Q=R2C. Then use the combining algorithm with Table A=table Z2 and Table B=table Z2. Let R4B=X and S4B=J.

Step 15: Set I=S2A, J=S4B, R=R2A and Q=R4B. Then use the combining algorithm with Table A=table Z2 and Table B=table Z4. Let R6A=X and S6A=J.

Step 16: Set I=S2E, J=S2F, R=R2E and Q=R2F. Then use the combining algorithm with Table A=table Z2 and Table B=table Z2. Let R4E=X and S4E=J.

Step 17: Set I=S2D, J=S4E, R=R2D and Q=R4E. Then use the combining algorithm with Table A=table Z2 and Table B=table Z4. Let R6D=X and S6D=J.

Step 18: Set I=S2H, J=S2J, R=R2H and Q=R2J. Then use the combining algorithm with Table A=table Z2 and Table B=table Z2. Let R4H=X and S4H=J.

Step 19: Set I=S2G, J=S4H, R=R2G and Q=R4H. Then use the combining algorithm with Table A=table Z2 and Table B=table Z4. Let R6G=X and S6G=J.

Step 20: Set I=S2L, J=S2M, R=R2L and Q=R2M. Then use the combining algorithm with Table A=table Z2 and Table B=table Z2. Let R4L=X and S4L=J.

Step 21: Set I=S2K, J=S4L, R=R2K and Q=R4L. Then use the combining algorithm with Table A=table Z2 and Table B=table Z4. Let R6K=X and S6K=J.

Step 22: Set I=S6A, J=S6D, R=R6A and Q=R6D. Then use the combining algorithm with Table A=table Z6 and Table B=table Z6. Let R12A=X and S12A=J.

Step 23: Set I=S6G, J=S6K, R=R6G and Q=R6K. Then use the combining algorithm with Table A=table Z6 and Table B=table Z6. Let R12G=X and S12G=J.

Step 24: Set I=S12A, J=S12G, R=R12A and Q=R12G. Then use the combining algorithm with Table A=table Z12 and Table B=table Z12. Let D=X and S=J.

Step 25: Scan the offset table (table 1) to find the entry for shell S. Add the value in the offset column to D giving a sum M.

Step 26: Multiply M by 8192 and add C. The result is the value of N.

The combining algorithm invoked above is as follows.

Step 1: Multiply Q by entry I of table A and add R to produce X.

Step 2: If I=0, the algorithm is complete. Otherwise subtract 1 from I, add 1 to J and then multiply entry I of table A by entry J of table B and add the product to X and repeat this step.

| Pattern Matrix | |
|---|---|
| Row | Coordinate<br>          1111111111222222<br>1234567890123456789 01234 |
| 1 | 000000110011000100010101 |
| 2 | 000001110001001110001000 |
| 3 | 000101010010000110000011 |
| 4 | 000111000011100010001000 |
| 5 | 001001110101010000010000 |
| 6 | 001010101100101000010000 |
| 7 | 001100000000011001001101 |
| 8 | 010001101100110000000001 |
| 9 | 010010001010000001100110 |
| 10 | 010100000110100101000 10 |
| 11 | 010100011000000011010010 |
| 12 | 101000001000000001100111 |

| Offset Table (table 1) | |
|---|---|
| Shell | Offset |
| 2 | 0 |
| 4 | 1,104 |
| 6 | 171,168 |
| 8 | 8,833,888 |
| 10 | 203,916,208 |
| 12 | 2,523,373,840 |
| 14 | 19,754,483,664 |
| 16 | 113,458,073,424 |
| 18 | 520,946,091,936 |
| 20 | 2,008,233,058,864 |
| 22 | 6,753,012,488,080 |
| 24 | 20,276,772,491,728 |
| 26 | 55,527,493,578,896 |
| 28 | 140,471,654,812,016 |
| 30 | 332,599,107,074,288 |
| 32 | 742,583,618,782,064 |
| 34 | 1,577,241,826,163,648 |
| 36 | 3,201,652,977,773,408 |
| 38 | 6,250,829,856,860,656 |
| 40 | 11,772,243,378,517,936 |
| 42 | 21,488,816,280,661,264 |
| 44 | 38,091,349,398,269,712 |
| 46 | 65,813,944,996,460,880 |
| 48 | 110,975,216,780,648,400 |
| 50 | 183,170,699,359,583,888 |
| 52 | 296,176,250,747,821,760 |
| 54 | 470,313,032,057,139,104 |
| 56 | 733,802,649,961,852,704 |
| 58 | 1,127,282,425,012,264,608 |
| 60 | 1,705,562,004,748,326,528 |
| 62 | 2,546,027,906,352,742,656 |
| 64 | 3,750,338,176,583,741,184 |

Offset Table (table 1)

| Shell | Offset |
|---|---|
| 66 | 5,459,698,938,503,358,288 |
| 68 | 7,855,306,052,010,638,928 |
| 70 | 11,185,364,161,430,427,120 |
| 72 | 15,761,598,618,153,912,048 |
| 74 | 22,006,333,253,178,287,488 |
| 76 | 30,439,267,863,141,761,248 |
| 78 | 41,758,145,964,051,168,928 |
| 80 | 56,805,942,222,418,254,624 |
| 82 | 76,705,521,974,670,315,648 |
| 84 | 102,790,003,409,884,499,616 |
| 86 | 136,825,213,243,612,237,984 |
| 88 | 180,871,853,681,611,950,304 |
| 90 | 237,647,674,612,416,058,144 |
| 92 | 310,274,972,509,704,813,568 |
| 94 | 402,855,562,706,550,178,432 |
| 96 | 520,030,903,624,780,216,192 |
| 98 | 667,887,282,878,315,058,752 |
| 100 | 853,204,877,392,029,630,224 |
| 102 | 1,084,866,366,316,724,513,600 |
| 104 | 1,372,628,843,781,043,137,728 |
| 106 | 1,729,261,230,348,138,347,936 |
| 108 | 2,168,594,752,191,117,510,656 |
| 110 | 2,708,748,750,998,791,808,896 |
| 112 | 3,369,061,029,531,845,159,680 |
| 114 | 4,174,907,475,749,930,441,344 |
| 116 | 5,153,012,845,572,620,444,544 |
| 118 | 6,338,485,997,759,954,228,064 |
| 120 | 7,767,814,007,243,823,839,904 |
| 122 | 9,489,088,807,416,724,301,088 |
| 124 | 11,551,560,348,210,870,663,936 |
| 126 | 14,020,397,101,121,777,789,184 |
| 128 | 16,961,486,827,188,962,520,704 |
| 130 | 20,462,257,878,140,766,824,144 |
| 132 | 24,609,951,889,446,752,483,600 |
| 134 | 29,520,947,360,446,140,239,888 |
| 136 | 35,309,668,202,124,931,709,648 |
| 138 | 42,129,631,517,897,299,694,192 |
| 140 | 50,129,857,007,333,339,232,368 |
| 142 | 59,511,140,048,476,876,253,552 |
| 144 | 70,465,868,440,255,241,753,840 |
| 146 | 83,255,084,071,227,534,308,224 |
| 148 | 98,125,093,343,012,843,683,744 |
| 150 | 115,412,613,794,490,713,387,776 |
| 152 | 135,431,325,977,840,557,716,032 |
| 154 | 158,612,397,740,580,988,792,832 |
| 156 | 185,352,173,129,019,034,813,952 |
| 158 | 216,200,163,114,557,452,649,088 |
| 160 | 251,653,554,301,571,825,870,208 |
| 162 | 292,407,894,227,049,291,537,120 |
| 164 | 339,084,303,287,704,694,137,264 |
| 166 | 392,557,502,327,740,879,513,552 |
| 168 | 453,598,102,325,630,140,035,472 |
| 170 | 523,302,245,924,753,258,804,112 |
| 172 | 602,619,554,566,350,712,176,720 |
| 174 | 692,915,189,017,751,886,612,624 |
| 176 | 795,356,236,008,523,094,321,424 |
| 178 | 911,633,121,557,068,121,682,768 |
| 180 | 1,043,170,702,590,018,684,540,528 |
| 182 | 1,192,056,699,908,246,215,817,040 |
| 184 | 1,360,020,268,709,003,330,894,928 |
| 186 | 1,549,625,404,920,394,770,580,176 |
| 188 | 1,762,966,570,548,122,052,971,216 |
| 190 | 2,003,176,071,047,978,658,185,168 |
| 192 | 2,272,775,796,193,092,396,592,208 |
| 194 | 2,575,585,656,054,138,708,462,352 |
| 196 | 2,914,624,028,838,764,473,032,112 |
| 198 | 3,294,525,191,675,170,663,348,864 |
| 200 | 3,718,899,779,744,493,071,204,800 |
| 202 | 4,193,342,739,035,337,171,766,768 |
| 204 | 4,722,146,931,451,409,521,239,376 |
| 206 | 5,312,060,154,473,602,161,379,024 |
| 208 | 5,968,158,963,699,136,006,897,744 |
| 210 | 6,698,542,086,960,014,568,788,272 |
| 212 | 7,509,212,883,615,628,699,979,056 |
| 214 | 8,409,846,821,357,616,140,398,480 |
| 216 | 9,407,504,001,506,860,931,212,240 |
| 218 | 10,513,739,929,400,091,829,175,120 |
| 220 | 11,736,809,764,883,851,223,578,160 |
| 222 | 13,090,450,253,047,376,115,538,352 |
| 224 | 14,584,327,787,390,434,105,633,840 |
| 226 | 16,234,701,307,190,010,119,347,120 |
| 228 | 18,052,821,776,055,874,414,204,240 |

TABLE Z1

| | | | | | | | | | |
|---|---|---|---|---|---|---|---|---|---|
| 0 | 1 | 46 | 0 | 92 | 0 | 138 | 0 | 184 | 0 |
| 1 | 2 | 47 | 0 | 93 | 0 | 139 | 0 | 185 | 0 |
| 2 | 0 | 48 | 0 | 94 | 0 | 140 | 0 | 186 | 0 |
| 3 | 0 | 49 | 2 | 95 | 0 | 141 | 0 | 187 | 0 |
| 4 | 2 | 50 | 0 | 96 | 0 | 142 | 0 | 188 | 0 |
| 5 | 0 | 51 | 0 | 97 | 0 | 143 | 0 | 189 | 0 |
| 6 | 0 | 52 | 0 | 98 | 0 | 144 | 2 | 190 | 0 |
| 7 | 0 | 53 | 0 | 99 | 0 | 145 | 0 | 191 | 0 |
| 8 | 0 | 54 | 0 | 100 | 2 | 146 | 0 | 192 | 0 |
| 9 | 2 | 55 | 0 | 101 | 0 | 147 | 0 | 193 | 0 |
| 10 | 0 | 56 | 0 | 102 | 0 | 148 | 0 | 194 | 0 |
| 11 | 0 | 57 | 0 | 103 | 0 | 149 | 0 | 195 | 0 |
| 12 | 0 | 58 | 0 | 104 | 0 | 150 | 0 | 196 | 2 |
| 13 | 0 | 59 | 0 | 105 | 0 | 151 | 0 | 197 | 0 |
| 14 | 0 | 60 | 0 | 106 | 0 | 152 | 0 | 198 | 0 |
| 15 | 0 | 61 | 0 | 107 | 0 | 153 | 0 | 199 | 0 |
| 16 | 2 | 62 | 0 | 108 | 0 | 154 | 0 | 200 | 0 |
| 17 | 0 | 63 | 0 | 109 | 0 | 155 | 0 | 201 | 0 |
| 18 | 0 | 64 | 2 | 110 | 0 | 156 | 0 | 202 | 0 |
| 19 | 0 | 65 | 0 | 111 | 0 | 157 | 0 | 203 | 0 |
| 20 | 0 | 66 | 0 | 112 | 0 | 158 | 0 | 204 | 0 |
| 21 | 0 | 67 | 0 | 113 | 0 | 159 | 0 | 205 | 0 |
| 22 | 0 | 68 | 0 | 114 | 0 | 160 | 0 | 206 | 0 |
| 23 | 0 | 69 | 0 | 115 | 0 | 161 | 0 | 207 | 0 |
| 24 | 0 | 70 | 0 | 116 | 0 | 162 | 0 | 208 | 0 |
| 25 | 2 | 71 | 0 | 117 | 0 | 163 | 0 | 209 | 0 |
| 26 | 0 | 72 | 0 | 118 | 0 | 164 | 0 | 210 | 0 |
| 27 | 0 | 73 | 0 | 119 | 0 | 165 | 0 | 211 | 0 |
| 28 | 0 | 74 | 0 | 120 | 0 | 166 | 0 | 212 | 0 |
| 29 | 0 | 75 | 0 | 121 | 2 | 167 | 0 | 213 | 0 |
| 30 | 0 | 76 | 0 | 122 | 0 | 168 | 0 | 214 | 0 |
| 31 | 0 | 77 | 0 | 123 | 0 | 169 | 2 | 215 | 0 |
| 32 | 0 | 78 | 0 | 124 | 0 | 170 | 0 | 216 | 0 |
| 33 | 0 | 79 | 0 | 125 | 0 | 171 | 0 | 217 | 0 |
| 34 | 0 | 80 | 0 | 126 | 0 | 172 | 0 | 218 | 0 |
| 35 | 0 | 81 | 2 | 127 | 0 | 173 | 0 | 219 | 0 |
| 36 | 2 | 82 | 0 | 128 | 0 | 174 | 0 | 220 | 0 |
| 37 | 0 | 83 | 0 | 129 | 0 | 175 | 0 | 221 | 0 |
| 38 | 0 | 84 | 0 | 130 | 0 | 176 | 0 | 222 | 0 |
| 39 | 0 | 85 | 0 | 131 | 0 | 177 | 0 | 223 | 0 |
| 40 | 0 | 86 | 0 | 132 | 0 | 178 | 0 | 224 | 0 |
| 41 | 0 | 87 | 0 | 133 | 0 | 179 | 0 | 225 | 2 |
| 42 | 0 | 88 | 0 | 134 | 0 | 180 | 0 | 226 | 0 |
| 43 | 0 | 89 | 0 | 135 | 0 | 181 | 0 | 227 | 0 |
| 44 | 0 | 90 | 0 | 136 | 0 | 182 | 0 | 228 | 0 |
| 45 | 0 | 91 | 0 | 137 | 0 | 183 | 0 | | |

TABLE Z2

| | | | | | | | | | |
|---|---|---|---|---|---|---|---|---|---|
| 0 | 1 | 46 | 0 | 92 | 0 | 138 | 0 | 184 | 0 |
| 1 | 4 | 47 | 0 | 93 | 0 | 139 | 0 | 185 | 16 |
| 2 | 4 | 48 | 0 | 94 | 0 | 140 | 0 | 186 | 0 |
| 3 | 0 | 49 | 4 | 95 | 0 | 141 | 0 | 187 | 0 |
| 4 | 4 | 50 | 12 | 96 | 0 | 142 | 0 | 188 | 0 |
| 5 | 8 | 51 | 0 | 97 | 8 | 143 | 0 | 189 | 0 |
| 6 | 0 | 52 | 8 | 98 | 4 | 144 | 4 | 190 | 0 |
| 7 | 4 | 53 | 0 | 99 | 0 | 145 | 16 | 191 | 0 |
| 8 | 4 | 54 | 0 | 100 | 12 | 146 | 8 | 192 | 0 |
| 9 | 4 | 55 | 0 | 101 | 8 | 147 | 0 | 193 | 8 |
| 10 | 8 | 56 | 0 | 102 | 0 | 148 | 8 | 194 | 8 |
| 11 | 0 | 57 | 0 | 103 | 0 | 149 | 8 | 195 | 0 |
| 12 | 0 | 58 | 8 | 104 | 8 | 150 | 0 | 196 | 4 |
| 13 | 8 | 59 | 0 | 105 | 0 | 151 | 0 | 197 | 8 |
| 14 | 0 | 60 | 0 | 106 | 8 | 152 | 0 | 198 | 0 |
| 15 | 0 | 61 | 8 | 107 | 0 | 153 | 8 | 199 | 0 |
| 16 | 4 | 62 | 0 | 108 | 0 | 154 | 0 | 200 | 12 |
| 17 | 8 | 63 | 0 | 109 | 8 | 155 | 0 | 201 | 0 |
| 18 | 4 | 64 | 4 | 110 | 0 | 156 | 0 | 202 | 8 |
| 19 | 0 | 65 | 16 | 111 | 0 | 157 | 8 | 203 | 0 |
| 20 | 8 | 66 | 0 | 112 | 0 | 158 | 0 | 204 | 0 |
| 21 | 0 | 67 | 0 | 113 | 8 | 159 | 0 | 205 | 16 |

TABLE Z2-continued

| | | | | | | | | | |
|---|---|---|---|---|---|---|---|---|---|
| 22 | 0 | 68 | 8 | 114 | 0 | 160 | 8 | 206 | 0 |
| 23 | 0 | 69 | 0 | 115 | 0 | 161 | 0 | 207 | 0 |
| 24 | 0 | 70 | 0 | 116 | 8 | 162 | 4 | 208 | 8 |
| 25 | 12 | 71 | 0 | 117 | 8 | 163 | 0 | 209 | 0 |
| 26 | 8 | 72 | 4 | 118 | 0 | 164 | 8 | 210 | 0 |
| 27 | 0 | 73 | 8 | 119 | 0 | 165 | 0 | 211 | 0 |
| 28 | 0 | 74 | 8 | 120 | 0 | 166 | 0 | 212 | 8 |
| 29 | 8 | 75 | 0 | 121 | 4 | 167 | 0 | 213 | 0 |
| 30 | 0 | 76 | 0 | 122 | 8 | 168 | 0 | 214 | 0 |
| 31 | 0 | 77 | 0 | 123 | 0 | 169 | 12 | 215 | 0 |
| 32 | 4 | 78 | 0 | 124 | 0 | 170 | 16 | 216 | 0 |
| 33 | 0 | 79 | 0 | 125 | 16 | 171 | 0 | 217 | 0 |
| 34 | 8 | 80 | 8 | 126 | 0 | 172 | 0 | 218 | 8 |
| 35 | 0 | 81 | 4 | 127 | 0 | 173 | 8 | 219 | 0 |
| 36 | 4 | 82 | 8 | 128 | 4 | 174 | 0 | 220 | 0 |
| 37 | 8 | 83 | 0 | 129 | 0 | 175 | 0 | 221 | 16 |
| 38 | 0 | 84 | 0 | 130 | 16 | 176 | 0 | 222 | 0 |
| 39 | 0 | 85 | 16 | 131 | 0 | 177 | 0 | 223 | 0 |
| 40 | 8 | 86 | 0 | 132 | 0 | 178 | 8 | 224 | 0 |
| 41 | 8 | 87 | 0 | 133 | 0 | 179 | 0 | 225 | 12 |
| 42 | 0 | 88 | 0 | 134 | 0 | 180 | 8 | 226 | 8 |
| 43 | 0 | 89 | 8 | 135 | 0 | 181 | 8 | 227 | 0 |
| 44 | 0 | 90 | 8 | 136 | 8 | 182 | 0 | 228 | 0 |
| 45 | 8 | 91 | 0 | 137 | 8 | 183 | 0 | | |

TABLE Z4

| | | | | | | | | | |
|---|---|---|---|---|---|---|---|---|---|
| 0 | 1 | 58 | 720 | 116 | 720 | 174 | 2,880 | | |
| 1 | 8 | 59 | 480 | 117 | 1,456 | 175 | 1,984 | | |
| 2 | 24 | 60 | 576 | 118 | 1,440 | 176 | 288 | | |
| 3 | 32 | 61 | 496 | 119 | 1,152 | 177 | 1,920 | | |
| 4 | 24 | 62 | 768 | 120 | 576 | 178 | 2,160 | | |
| 5 | 48 | 63 | 832 | 121 | 1,064 | 179 | 1,440 | | |
| 6 | 96 | 64 | 24 | 122 | 1,488 | 180 | 1,872 | | |
| 7 | 64 | 65 | 672 | 123 | 1,344 | 181 | 1,456 | | |
| 8 | 24 | 66 | 1,152 | 124 | 768 | 182 | 2,688 | | |
| 9 | 104 | 67 | 544 | 125 | 1,248 | 183 | 1,984 | | |
| 10 | 144 | 68 | 432 | 126 | 2,496 | 184 | 576 | | |
| 11 | 96 | 69 | 768 | 127 | 1,024 | 185 | 1,824 | | |
| 12 | 96 | 70 | 1,152 | 128 | 24 | 186 | 3,072 | | |
| 13 | 112 | 71 | 576 | 129 | 1,408 | 187 | 1,728 | | |
| 14 | 192 | 72 | 312 | 130 | 2,016 | 188 | 1,152 | | |
| 15 | 192 | 73 | 592 | 131 | 1,056 | 189 | 2,560 | | |
| 16 | 24 | 74 | 912 | 132 | 1,152 | 190 | 2,880 | | |
| 17 | 144 | 75 | 992 | 133 | 1,280 | 191 | 1,536 | | |
| 18 | 312 | 76 | 480 | 134 | 1,632 | 192 | 96 | | |
| 19 | 160 | 77 | 768 | 135 | 1,920 | 193 | 1,552 | | |
| 20 | 144 | 78 | 1,344 | 136 | 432 | 194 | 2,352 | | |
| 21 | 256 | 79 | 640 | 137 | 1,104 | 195 | 2,688 | | |
| 22 | 288 | 80 | 144 | 138 | 2,304 | 196 | 1,368 | | |
| 23 | 192 | 81 | 968 | 139 | 1,120 | 197 | 1,584 | | |
| 24 | 96 | 82 | 1,008 | 140 | 1,152 | 198 | 3,744 | | |
| 25 | 248 | 83 | 672 | 141 | 1,536 | 199 | 1,600 | | |
| 26 | 336 | 84 | 768 | 142 | 1,728 | 200 | 744 | | |
| 27 | 320 | 85 | 864 | 143 | 1,344 | 201 | 2,176 | | |
| 28 | 192 | 86 | 1,056 | 144 | 312 | 202 | 2,448 | | |
| 29 | 240 | 87 | 960 | 145 | 1,440 | 203 | 1,920 | | |
| 30 | 576 | 88 | 288 | 146 | 1,776 | 204 | 1,728 | | |
| 31 | 256 | 89 | 720 | 147 | 1,824 | 205 | 2,016 | | |
| 32 | 24 | 90 | 1,872 | 148 | 912 | 206 | 2,496 | | |
| 33 | 384 | 91 | 896 | 149 | 1,200 | 207 | 2,496 | | |
| 34 | 432 | 92 | 576 | 150 | 2,976 | 208 | 336 | | |
| 35 | 384 | 93 | 1,024 | 151 | 1,216 | 209 | 1,920 | | |
| 36 | 312 | 94 | 1,152 | 152 | 480 | 210 | 4,608 | | |
| 37 | 304 | 95 | 960 | 153 | 1,872 | 211 | 1,696 | | |
| 38 | 480 | 96 | 96 | 154 | 2,304 | 212 | 1,296 | | |
| 39 | 448 | 97 | 784 | 155 | 1,536 | 213 | 2,304 | | |
| 40 | 144 | 98 | 1,368 | 156 | 1,344 | 214 | 2,592 | | |
| 41 | 336 | 99 | 1,248 | 157 | 1,264 | 215 | 2,112 | | |
| 42 | 768 | 100 | 744 | 158 | 1,920 | 216 | 960 | | |
| 43 | 352 | 101 | 816 | 159 | 1,728 | 217 | 2,048 | | |
| 44 | 288 | 102 | 1,728 | 160 | 144 | 218 | 2,640 | | |
| 45 | 624 | 103 | 832 | 161 | 1,536 | 219 | 2,368 | | |
| 46 | 576 | 104 | 336 | 162 | 2,904 | 220 | 1,728 | | |
| 47 | 384 | 105 | 1,536 | 163 | 1,312 | 221 | 2,016 | | |
| 48 | 96 | 106 | 1,296 | 164 | 1,008 | 222 | 3,648 | | |
| 49 | 456 | 107 | 864 | 165 | 2,304 | 223 | 1,792 | | |
| 50 | 744 | 108 | 960 | 166 | 2,016 | 224 | 192 | | |
| 51 | 576 | 109 | 880 | 167 | 1,344 | 225 | 3,224 | | |
| 52 | 336 | 110 | 1,728 | 168 | 768 | 226 | 2,736 | | |
| 53 | 432 | 111 | 1,216 | 169 | 1,464 | 227 | 1,824 | | |

TABLE Z4-continued

| | | | | | | | |
|---|---|---|---|---|---|---|---|
| 54 | 960 | 112 | 192 | 170 | 2,592 | 228 | 1,920 |
| 55 | 576 | 113 | 912 | 171 | 2,080 | | |
| 56 | 192 | 114 | 1,920 | 172 | 1,056 | | |
| 57 | 640 | 115 | 1,152 | 173 | 1,392 | | |

TABLE Z6

| | | | | | |
|---|---|---|---|---|---|
| 0 | 1 | 77 | 69,120 | 154 | 345,600 |
| 1 | 12 | 78 | 92,480 | 155 | 499,200 |
| 2 | 60 | 79 | 124,800 | 156 | 353,600 |
| 3 | 160 | 80 | 106,392 | 157 | 295,800 |
| 4 | 252 | 81 | 70,860 | 158 | 424,320 |
| 5 | 312 | 82 | 100,920 | 159 | 449,600 |
| 6 | 544 | 83 | 137,760 | 160 | 425,880 |
| 7 | 960 | 84 | 96,768 | 161 | 304,128 |
| 8 | 1,020 | 85 | 90,480 | 162 | 354,300 |
| 9 | 876 | 86 | 125,664 | 163 | 531,360 |
| 10 | 1,560 | 87 | 134,720 | 164 | 423,864 |
| 11 | 2,400 | 88 | 123,360 | 165 | 299,520 |
| 12 | 2,080 | 89 | 95,064 | 166 | 468,384 |
| 13 | 2,040 | 90 | 113,880 | 167 | 557,760 |
| 14 | 3,264 | 91 | 163,200 | 168 | 391,680 |
| 15 | 4,160 | 92 | 137,280 | 169 | 344,772 |
| 16 | 4,092 | 93 | 92,160 | 170 | 452,400 |
| 17 | 3,480 | 94 | 150,144 | 171 | 525,600 |
| 18 | 4,380 | 95 | 187,200 | 172 | 480,480 |
| 19 | 7,200 | 96 | 131,104 | 173 | 359,160 |
| 20 | 6,552 | 97 | 112,920 | 174 | 458,048 |
| 21 | 4,608 | 98 | 141,180 | 175 | 624,960 |
| 22 | 8,160 | 99 | 175,200 | 176 | 492,000 |
| 23 | 10,560 | 100 | 164,052 | 177 | 334,080 |
| 24 | 8,224 | 101 | 122,424 | 178 | 475,320 |
| 25 | 7,812 | 102 | 157,760 | 179 | 640,800 |
| 26 | 10,200 | 103 | 212,160 | 180 | 478,296 |
| 27 | 13,120 | 104 | 173,400 | 181 | 393,144 |
| 28 | 12,480 | 105 | 119,808 | 182 | 554,880 |
| 29 | 10,104 | 106 | 168,600 | 183 | 595,520 |
| 30 | 14,144 | 107 | 228,960 | 184 | 542,784 |
| 31 | 19,200 | 108 | 170,560 | 185 | 427,440 |
| 32 | 16,380 | 109 | 142,584 | 186 | 460,800 |
| 33 | 11,520 | 110 | 212,160 | 187 | 696,000 |
| 34 | 17,400 | 111 | 219,200 | 188 | 574,080 |
| 35 | 24,960 | 112 | 196,800 | 189 | 377,856 |
| 36 | 18,396 | 113 | 153,240 | 190 | 636,480 |
| 37 | 16,440 | 114 | 172,800 | 191 | 729,600 |
| 38 | 24,480 | 115 | 274,560 | 192 | 524,320 |
| 39 | 27,200 | 116 | 212,184 | 193 | 447,000 |
| 40 | 26,520 | 117 | 148,920 | 194 | 564,600 |
| 41 | 20,184 | 118 | 236,640 | 195 | 707,200 |
| 42 | 23,040 | 119 | 278,400 | 196 | 592,956 |
| 43 | 36,960 | 120 | 213,824 | 197 | 465,720 |
| 44 | 31,200 | 121 | 174,252 | 198 | 595,680 |
| 45 | 22,776 | 122 | 223,320 | 199 | 792,000 |
| 46 | 35,904 | 123 | 269,120 | 200 | 664,020 |
| 47 | 44,160 | 124 | 249,600 | 201 | 430,848 |
| 48 | 32,800 | 125 | 195,312 | 202 | 612,120 |
| 49 | 28,236 | 126 | 238,272 | 203 | 808,320 |
| 50 | 39,060 | 127 | 322,560 | 204 | 603,200 |
| 51 | 46,400 | 128 | 262,140 | 205 | 524,784 |
| 52 | 42,840 | 129 | 177,408 | 206 | 721,344 |
| 53 | 33,720 | 130 | 265,200 | 207 | 770,880 |
| 54 | 44,608 | 131 | 343,200 | 208 | 695,640 |
| 55 | 62,400 | 132 | 241,920 | 209 | 518,400 |
| 56 | 49,344 | 133 | 207,360 | 210 | 599,040 |
| 57 | 34,560 | 134 | 305,184 | 211 | 890,400 |
| 58 | 50,520 | 135 | 341,120 | 212 | 708,120 |
| 59 | 69,600 | 136 | 295,800 | 213 | 483,840 |
| 60 | 54,080 | 137 | 225,240 | 214 | 778,464 |
| 61 | 44,664 | 138 | 253,440 | 215 | 960,960 |
| 62 | 65,280 | 139 | 386,400 | 216 | 674,368 |
| 63 | 70,080 | 140 | 324,480 | 217 | 552,960 |
| 64 | 65,532 | 141 | 211,968 | 218 | 712,920 |
| 65 | 53,040 | 142 | 342,720 | 219 | 852,800 |
| 66 | 57,600 | 143 | 408,000 | 220 | 811,200 |
| 67 | 89,760 | 144 | 298,716 | 221 | 591,600 |
| 68 | 73,080 | 145 | 262,704 | 222 | 745,280 |
| 69 | 50,688 | 146 | 319,800 | 223 | 994,560 |
| 70 | 84,864 | 147 | 376,480 | 224 | 786,624 |
| 71 | 100,800 | 148 | 345,240 | 225 | 570,276 |
| 72 | 74,460 | 149 | 266,424 | 226 | 766,200 |
| 73 | 63,960 | 150 | 354,144 | 227 | 1,030,560 |

TABLE Z6-continued

| | | | | | |
|---|---|---|---|---|---|
| 74 | 82,200 | 151 | 456,000 | 228 | 725,760 |
| 75 | 104,160 | 152 | 370,080 | | |
| 76 | 93,600 | 153 | 254,040 | | |

TABLE Z12

| | | | |
|---|---|---|---|
| 0 | 1 | 77 | 21,654,935,808 |
| 1 | 24 | 78 | 23,917,274,304 |
| 2 | 264 | 79 | 24,615,220,608 |
| 3 | 1,760 | 80 | 25,376,943,024 |
| 4 | 7,944 | 81 | 28,009,137,752 |
| 5 | 25,872 | 82 | 30,586,037,328 |
| 6 | 64,416 | 83 | 31,513,408,608 |
| 7 | 133,056 | 84 | 32,579,551,488 |
| 8 | 253,704 | 85 | 35,508,322,080 |
| 9 | 472,760 | 86 | 38,810,229,216 |
| 10 | 825,264 | 87 | 40,037,878,848 |
| 11 | 1,297,056 | 88 | 40,859,536,608 |
| 12 | 1,938,336 | 89 | 44,672,951,664 |
| 13 | 2,963,664 | 90 | 48,932,378,352 |
| 14 | 4,437,312 | 91 | 49,926,264,960 |
| 15 | 6,091,584 | 92 | 51,130,316,736 |
| 16 | 8,118,024 | 93 | 55,883,287,552 |
| 17 | 11,368,368 | 94 | 60,547,082,112 |
| 18 | 15,653,352 | 95 | 61,923,031,104 |
| 19 | 19,822,176 | 96 | 63,385,408,416 |
| 20 | 24,832,944 | 97 | 68,696,763,696 |
| 21 | 32,826,112 | 98 | 74,577,903,048 |
| 22 | 42,517,728 | 99 | 76,393,194,528 |
| 23 | 51,425,088 | 100 | 77,602,957,944 |
| 24 | 61,903,776 | 101 | 84,080,984,592 |
| 25 | 78,146,664 | 102 | 91,461,572,928 |
| 26 | 98,021,616 | 103 | 92,741,489,856 |
| 27 | 115,331,264 | 104 | 94,198,772,976 |
| 28 | 133,522,752 | 105 | 102,562,521,600 |
| 29 | 164,079,696 | 106 | 110,403,610,416 |
| 30 | 201,364,416 | 107 | 112,206,096,288 |
| 31 | 229,101,312 | 108 | 114,458,740,800 |
| 32 | 259,776,264 | 109 | 123,091,514,832 |
| 33 | 314,269,824 | 110 | 132,910,417,728 |
| 34 | 374,842,512 | 111 | 135,359,463,232 |
| 35 | 420,258,432 | 112 | 136,447,747,392 |
| 36 | 471,023,592 | 113 | 147,394,340,016 |
| 37 | 554,746,896 | 114 | 159,500,457,600 |
| 38 | 653,690,400 | 115 | 160,956,544,896 |
| 39 | 724,846,144 | 116 | 162,940,575,600 |
| 40 | 793,078,704 | 117 | 176,121,743,248 |
| 41 | 927,125,232 | 118 | 188,740,015,200 |
| 42 | 1,082,704,128 | 119 | 190,918,949,760 |
| 43 | 1,175,873,952 | 120 | 193,511,203,776 |
| 44 | 1,279,397,088 | 121 | 207,502,774,008 |
| 45 | 1,482,713,808 | 122 | 222,973,423,728 |
| 46 | 1,699,194,816 | 123 | 226,147,998,912 |
| 47 | 1,834,739,328 | 124 | 227,429,983,488 |
| 48 | 1,980,797,856 | 125 | 244,215,894,432 |
| 49 | 2,259,791,448 | 126 | 263,101,540,416 |
| 50 | 2,578,950,264 | 127 | 264,312,339,456 |
| 51 | 2,771,448,768 | 128 | 266,010,877,704 |
| 52 | 2,949,559,536 | 129 | 286,962,805,888 |
| 53 | 3,345,875,856 | 130 | 306,415,571,616 |
| 54 | 3,803,764,800 | 131 | 308,637,532,896 |
| 55 | 4,028,054,976 | 132 | 312,172,889,472 |
| 56 | 4,264,256,832 | 133 | 332,945,133,312 |
| 57 | 4,833,186,688 | 134 | 356,433,028,512 |
| 58 | 5,414,943,600 | 135 | 360,323,811,456 |
| 59 | 5,719,271,712 | 136 | 360,223,654,032 |
| 60 | 6,059,238,336 | 137 | 386,088,721,392 |
| 61 | 6,756,214,608 | 138 | 414,603,535,104 |
| 62 | 7,558,096,128 | 139 | 415,108,384,416 |
| 63 | 7,972,913,344 | 140 | 417,392,122,752 |
| 64 | 8,312,839,944 | 141 | 447,681,704,448 |
| 65 | 9,284,959,200 | 142 | 476,316,548,928 |
| 66 | 10,374,325,632 | 143 | 478,377,518,784 |
| 67 | 10,801,349,856 | 144 | 481,341,997,032 |
| 68 | 11,279,351,952 | 145 | 512,942,325,984 |
| 69 | 12,564,531,456 | 146 | 547,290,900,816 |
| 70 | 13,871,037,312 | 147 | 551,426,235,360 |
| 71 | 14,433,084,864 | 148 | 550,868,402,352 |
| 72 | 15,042,871,272 | 149 | 587,521,351,824 |
| 73 | 16,585,653,744 | 150 | 629,263,864,416 |
| 74 | 18,306,804,912 | 151 | 628,022,995,776 |
| 75 | 19,068,642,080 | 152 | 628,196,474,400 |
| 76 | 19,670,138,400 | 153 | 673,500,182,256 |
| 154 | 714,637,972,224 | | |
| 155 | 715,961,510,400 | | |
| 156 | 719,692,526,784 | | |
| 157 | 763,113,874,512 | | |
| 158 | 812,342,889,600 | | |
| 159 | 816,313,861,440 | | |
| 160 | 812,060,601,264 | | |
| 161 | 865,462,338,048 | | |
| 162 | 924,314,846,664 | | |
| 163 | 920,507,154,912 | | |
| 164 | 920,361,668,688 | | |
| 165 | 982,725,974,784 | | |
| 166 | 1,039,906,730,016 | | |
| 167 | 1,039,128,015,552 | | |
| 168 | 1,040,478,667,008 | | |
| 169 | 1,102,867,760,040 | | |
| 170 | 1,171,757,692,512 | | |
| 171 | 1,174,521,854,176 | | |
| 172 | 1,167,835,079,136 | | |
| 173 | 1,239,722,456,016 | | |
| 174 | 1,321,246,238,400 | | |
| 175 | 1,313,545,628,736 | | |
| 176 | 1,307,424,001,248 | | |
| 177 | 1,395,533,705,856 | | |
| 178 | 1,474,191,694,800 | | |
| 179 | 1,470,135,873,888 | | |
| 180 | 1,472,419,748,592 | | |
| 181 | 1,554,105,008,016 | | |
| 182 | 1,647,547,321,728 | | |
| 183 | 1,648,658,651,200 | | |
| 184 | 1,632,926,218,176 | | |
| 185 | 1,734,153,444,192 | | |
| 186 | 1,844,175,455,232 | | |
| 187 | 1,829,372,897,088 | | |
| 188 | 1,821,916,743,552 | | |
| 189 | 1,937,378,426,368 | | |
| 190 | 2,043,436,190,400 | | |
| 191 | 2,033,547,631,104 | | |
| 192 | 2,028,332,946,336 | | |
| 193 | 2,142,281,587,248 | | |
| 194 | 2,267,057,828,112 | | |
| 195 | 2,265,622,499,712 | | |
| 196 | 2,244,116,900,808 | | |
| 197 | 2,373,665,758,992 | | |
| 198 | 2,521,003,646,304 | | |
| 199 | 2,496,637,706,688 | | |
| 200 | 2,478,371,203,704 | | |
| 201 | 2,635,440,022,912 | | |
| 202 | 2,774,666,532,528 | | |
| 203 | 2,758,012,109,952 | | |
| 204 | 2,752,161,876,288 | | |
| 205 | 2,897,346,782,880 | | |
| 206 | 3,060,483,556,416 | | |
| 207 | 3,053,047,659,072 | | |
| 208 | 3,014,173,603,056 | | |
| 209 | 3,190,254,080,640 | | |
| 210 | 3,384,533,104,128 | | |
| 211 | 3,345,812,189,280 | | |
| 212 | 3,322,145,004,336 | | |
| 213 | 3,521,864,694,528 | | |
| 214 | 3,702,736,569,312 | | |
| 215 | 3,676,376,713,152 | | |
| 216 | 3,655,417,972,800 | | |
| 217 | 3,849,584,302,080 | | |
| 218 | 4,061,967,241,200 | | |
| 219 | 4,046,622,779,584 | | |
| 220 | 3,999,395,297,088 | | |
| 221 | 4,217,474,077,344 | | |
| 222 | 4,466,860,398,528 | | |
| 223 | 4,411,797,088,512 | | |
| 224 | 4,366,319,445,312 | | |
| 225 | 4,633,748,755,400 | | |
| 226 | 4,864,028,873,616 | | |
| 227 | 4,821,900,001,248 | | |
| 228 | 4,799,513,769,600 | | |

Having described the preferred method of operation for encoding blocks of bits with 24 coordinates, treated as 24 dimensions it is desired to discuss encoding with other values of K.

In general (for other values of K,) the 1 dimension tables of acceptable values for shells may be calculated using the coordinate values as allowed by the rules for the dimension used. The tables of numbers of available points in the K dimension may then be dealt using the combining algorithm until the K dimension tables are reached. The number of available points in the K dimension are reduced to take into account the modulo sum rules for the dimension employed and an offset table is produced using numbers of the K dimensional points. A number N (or M if there is a choice of alternate lattices or of signs) is used with the offset table to determine a shell and an identifying number $X_K$. The general form of the splitting algorithm previously described is used with the tables produced to derive K coordinates and signs. The coordinates (if necessary) are modified for alternative lattices in accord with the rules applicable to dimension K. The coordinates (modified or not) are used to provide for modulation on a carrier in accord with their values. The modulated carrier having travelled the channel, the transmitted coordinates are detected in a manner suitable to the dimensionality and signal speed used. The detected K coordinates and signs are used with the general form of the combining algorithm as described to provide the shell number and $X_K$ identifying the detected coordinates; which with reference to the offset table and if necessary inversion of the factors relating M to N, will provide the number M which identifies the block of b bits to be transmitted in serial binary form at the receiver.

The range of dimensions of K with which the invention is available is $40 \geq K > 4$. For values of K equal to 8, 7, 6, 5 in fact other methods may be found to be simpler and faster. For K=8 the means and method described in co pending application, Ser. No. 584,235 filed Feb. 27, 1984 (and assigned to the same assignee as this application) are found to be simpler and more economical than the present method. However, the means and method of this invention are exceptionally good for K=24 and are the only ones known applicable to K=9-40. Above K=24 the algorithms although applicable will require more and more microprocessor, chip or hardware capacity and very little research has been done in dimensions over 40.

In the disclosure and claims herein, the symbol A is sometimes used to designate the divisor for N corresponding to a choice of lattices. Such divisor for K=24 being 8192 representing the 4096 Leech lattice vectors and the choice of even or odd coordinates. The symbol B is sometimes used to designate the divisor for N corresponding to a choice of signs where signs are not taken into account in the table of available points. Thus where the tables do not take such account, a message point with 8 or 2 non zero coordinates would have B equal to 256 or 4 respectively. In some cases B will be reduced because the modulo sum rule in the dimension used further reduces the number of permissible sign changes.

It is desired to discuss briefly the use of the invention in coding where $K=8$. Where $K=8$ there is only one lattice so that $N=M$. The densest or 'best' known packing or spheres in 8 dimensions may be described by the following rules for the coordinates:

1. The coordinates must be 8 even integers or 8 odd integers
2. The sum of the coordinates must be 0 modulo 4. (each point in this lattice has 240 nearest neighbours at a distance for $2\sqrt{2}$).

To enumerate the points by shell in one dimension:
For even points:

| Shell No (I or J) | $r^2$ | $Z_{1,}$ |
|---|---|---|
| 0 | 0 | 1 |
| ½ | 4 | 2 |
| 1 | 8 | 0 |
| 1½ | 12 | 0 |
| 2 | 16 | 2 |
| 2½ | 20 | 0 |
| 3 | 24 | 0 |
| 3½ | 28 | 0 |
| 4 | 52 | 0 |
| 4½ | 36 | 2 |
| 5 | 40 | 0 |

For odd points (sign changes omitted):

| Shell No. (I or J) | $r^2$ | $D_1'$ | Integral Coordinates |
|---|---|---|---|
| 0 | 0 | 0 | none |
| ⅛ | 1 | 1 | 1 |
| 2/8 | 2 | 0 | none |
| ⅜ | 3 | 0 | none |
| 4/8 | 4 | 0 | none |
| ⅝ | 5 | 0 | none |
| 6/8 | 6 | 0 | none |
| ⅞ | 7 | 0 | none |
| 1 | 8 | 0 | none |
| 1⅛ | 9 | 1 | 3 |
| etc | etc | etc | |

The application of the summing algorithm sequentially to the even points table and to the odd points table (the latter with multiplication by 128 in 8 dimensions to take sign changes into account) will produce the Z and N' tables for 1, 2 and 4 dimensions and an offset table for 8 dimensions. (Multiplication was by 128 instead of 256 because modulo sum rules limit sign choices to 7 not 8 coordinates). From the table for 8 dimensions the values or rows which will not satisfy the 0 modulo 4 rules are eliminated. The result is the offset table:

| Shell | SI | Even/Odd | Offset |
|---|---|---|---|
| 1 | O | Odd | 0 |
| 1 | E | Even | 128 |
| 2 | O | Odd | 240 |
| 2 | E | Even | 1264 |
| 3 | O | Odd | 2400 |
| 3 | E | Even | 5984 |
| 4 | O | Odd | 9120 |
| etc | | etc | etc |

Where successive entries in the sum columns are obtained by alternately adding elements of $D_8' \times 128$ and $Z_8$.

The binary data is encoded in blocks of b bits and each such block is represented by the number N. Since there is only one lattice the division of N would be by unity i.e. $N=M$. and remainder C would be 0.

As with $K=24$ the value of N is checked against the offset table to find the largest offset value which does not exceed N. The shell is identified (reffered to hereafter SI(E or O) and (here) whether even or odd coordinates are being used. N less the offset value gives a residue $X_8$ identifying a point on the even or odd sub-shell.

If an even sub-shell has been identified and splitting algorithm (in form the same as that used for $K=24$) becomes:

Splitting Algorithm:
1. Initialize Set $I=0$
2. $Z_{4,I} \times Z_{4,SI(E \text{ or } O)}$ If $P>X_8$ go to step 3 Otherwise set $I=I+\frac{1}{2}$ $X_8=X_8-P$ and repeat this step
3. Divide last $X_8$ by entry $Z_{4,I}$ for last I giving quotient Q and remainder R Repeat the splitting algorithm where one 4D shell is (last) I with $X_4=R$ and the other 4D shell is SI(E or O)-(last) I with $X_4=Q$.

The four dimensional sub-shells are then split into two, two dimensional sub-shells using Z2 in place of Z4 and finally each of these are split, producing a total of 8 values of S and corresponding values of Q or R. The eight values of S each determine a coordinate C (by table look up or by multiplying by 8 and taking the square root). The four values of Q and four values of R each determine the sign of the coordinate to which they correspond and the preferred convention is: + if R or $Q=0$; − if R or $Q=1$.

When an odd coordinate sub-shell is identified it is preferred to set aside the low order 7 bits of $X_8$ to later determine the sign changes the use $X_8/128$ in the splitting process.

$X_8/128$ may now be split into 8 coordinates as for the even points using the vectors $D_4'$, $D_2'$ and $D_1'$. The specific form of the algorithm is altered in that I is initialized to the lowest shell number in the table and the step size is 1 rather than ½. The division in the last split is not needed since it is always a division by unity.

The seven bits reserved for sign changes are used to control the signs of seven coordinates. The sign of the eighth coordinate must be chosen in accord with the 0 modulo 4 rule.

The coordinates C1, C2, . . . C8 thus selected are modulated on a carrier and transmitted on a channel. The demodulated and detected coordinates at the receiver are detected as to value and whether positive or negative. The detected values are used in the combining algorithm which is the exact reverse of the splitting algorithm. When the value $X_8/128$ thus obtained and the lower 7 binary places obtained by the pattern of positive or negative values, the value $X_8$ is obtained. From $X_8$ and the offset table the number N is reconstructed. From N is reconstituted the block of b binary data which is then sent on in serial binary form.

It is desired to discuss briefly the use of the invention in coding where $K=16$. The densest known packing of spheres in 16 dimensions has only one lattice so that $N=M$ and may be described by the following rules for the coordinates:

1. The coordinates must be even integers where a row of the position matrix has a zero and odd integers where the row of the position matrix has a one. Or alternatively the coordinates must be odd where the row has a zero and must be even where the row has a one.

The position matrix is the 16 dimension Hadamard matrix of ones and zeroes as follows:

```
0000000000000000
0101010101010101
0011001100110011
0110011001100110
0000111100001111
0101101001011010
0011110000111100
0110100101101001
0000000011111111
0101010110101010
0011001111001100
0110011010011001
0000111111110000
0101101010100101
0011110011000011
0110100110010110
```

As with the 24 dimensional matrices, the process using the above 16 dimension Hadamard matrix is unchanged if columns are interchanged so long as the same column arranged is used at encoder and decoder.

2. The sum of the coordinates must be 0 mod 4.

It will be noted that because of the alternative choices for representation of 'even' or 'odd' by "1's" or "0's"; there are 32 patterns which can be sent. Tables of available points are required as follows:

A table of points for $N'16, n$ (with its supporting tables for $N'8, N'4, N'2, N'1$) is discussed on pages 7 and 8. $D'_{16}, n$ (with its supporting tables for $D_8', D_4', D_2', D_1'$) as discussed on pages 9 and 10.

$N_8', D_8'$ being (in accord with the summing algorithm)

$$N_8 D'_{8,n} = \sum_{I=o}^{I=n} N_8', IXD'_{8,n-I}$$

where the value of n, is determined by the number of total message points required given the signalling rate desired.

The rule that the sum of the coordinates must be 0 mod 4 allows only those terms of $N_{16}'$ where $r^2$ from the origin is a multiple of 8. This rule also restricts the choice of signs of odd coordinates so that only 15 signs of $D_{16}$ and 7 signs of $N_8'D_8'$ may be freely chosen and the remaining sign is then determined by the 0 mod 4 rule.

The Hadamard matrix allows one case of 16 even coordinates, one case of 16 odd coordinates and 30 cases of 8 even or 8 odd. The total number of points is therefore represented by (the sum of the points in $N_{16}')+30\times128\times$(the sum of the points in $N_8'D_8')+32768\times$(the sum of the points in $D_{16}'$). Using shell number $S_n$ as $\frac{1}{4}$ of $r^2$ the number of points per shell is now:

| Shell | Points |
|---|---|
| S0 | 1 |
| S1 | 0 |
| S2 | 4,320 |
| S3 | 61,440 |
| S4 | 522,720 |
| S5 | 2,211,840 |
| S6 | 8,960,640 |
| S7 | 23,224,320 |
| S8 | 67,154,400 |
| S9 | 135,168,000 |

For encoding and decoding the tables of available points in 16 dimensions are restated by shells, dividing each shell up into sub-shells according to the type of table, i.e. "a" sub-shells derived from $N_{16}'$, "b" sub-shells derived from $N_8'D_8'$ and "c" sub-shells from $D_{16}'$.

| Shell | Points |
|---|---|
| S0a | 1 |
| S2a | 480 |
| S2b | 3,840 |
| S3b | 61,440 |
| S4a | 29,152 |
| S4b | 460,800 |
| S4c | 32,768 |
| S5b | 2,211,840 |
| S6a | 525,952 |
| S6b | 7,910,400 |
| S6c | 524,288 |
| S7b | 23,224,320 |
| S8a | 3,994,080 |
| S8b | 59,228,160 |
| S8c | 3,932,160 |
| S9b | 135,168,000 |
| S10a | 18,626,112 |
| S10b | 282,309,120 |
| S10c | 18,874,368 |

The binary data is encoded in blocks of b bits and each such block is represented by the number N. Since there is only one lattice the division of N would be by unity i.e. N=M.

An offset table is provided from the table of points and, the value of N is checked against such offset table to find the largest offset value and whether all even, all odd or half even and half odd coordinates are being used. The excess of N over the value in the offset table is a value $X_{16}$ identifying a point on the selected sub-shell. Where the value in the table for the sub-set resulted in multiplication by a power of two to allow for sign changes, $X_{16}$ may now be divided by that power of two replacing X by the quotient and setting the remainder aside for later determining the signs of the corresponding coordinates. The possible divisions are:

for a "b" sub-shell divide by $2^7$ for a "c" sub-shell divide by $2^{15}$

Since there are 30 rows in the position matrix having the same number of ones and zeros we may also (in the event a "b" sub-shell is selected) divide $X_{16}$ by the number of such rows, replacing $X_{16}$ or the quotient from the prior division and setting the remainder aside to determine the specific row to be used.

At this point, in addition to any remainders set aside there is a remainder and a specific sub-shell, having a corresponding $r^2$ value.

Splitting:

The values of the remainder and $r^2$ corresponding to the 16th dimension is split into two pairs of values of $X_8$ and $r^2$ corresponding to each in the eighth dimension. Note that each $X_8$ is used to choose one message point from among those in a sub-shell and may therefore have any value between zero and one less than the number of points in the sub-shell.

The number of points in the sub-shell was enumerated by use of the summing algorithm from a pair of tables in lower dimensions.

As a specific example $N_8'D_8'$ was produced as the product of $N'8$ and $N'8$. The coefficients (numbers of available points) of N'8 and D'8 are listed below, filled out with zero coefficients as required.

| $r^2$ | $N_8'$ | $D_8'$ |
|---|---|---|
| 0 | 1 | 0 |
| 4 | 16 | 0 |
| 8 | 112 | 1 |
| 12 | 448 | 0 |
| 16 | 1136 | 8 |
| 20 | 2016 | 0 |
| 24 | 3136 | 28 |
| 28 | 5504 | 0 |
| 32 | 9328 | 64 |
| 36 | 12112 | 0 |
| 40 | 14112 | 128 |

The splitting algorithm is then performed in a manner similar to that described for K=24, K=8 to provide two sets of paired values $X_8$ and $r^2$, one for $N_8'$ and one for $D_8'$. These may in turn be split into two $D_4'$ pairs and two $N_4'$ pairs and the splitting process continued until there are 16 1 dimensional pairs of $X_1$ and $r^2$. The square root of $r^2$ gives the absolute value of the coordinate. For even coordinates where the sign factors were incorporated in the table values, the value of $X_1$ will be 0 or 1 to signify positive or negative sign.

In a similar way the $N_{16}'$ and $D_{16}'$ sub-shells may each be split into coordinates by using the lower dimensional tables which, with the summing algorithm were used to determine the number of points on that subshell. It would be possible to use tables other than that from which the sub-shell number was built up. $N_{16}'$, for example could be split up into $N'4$ and $N'12$ although there seems no good reason for this complicating the procedure.

Sign changes and interleaving. For odd coordinates, the sign bits set aside in the previous (sign) division determine the signs of all but one of the odd coordinates. The sign of one (preferably the last) coordinate must be determined according to the 0 mod 4 rule. Formally the remainder of the divison by 30 is used to select a row of the position matrix and coordinates are interleaved in accord with this remainder.

Decoding. The operation of decoding is the inverse of encoding. The detected coordinates at the receiver are used to produce the value N used in encoding.

It should be noted that every step performed in the encoding procedure is reversible and the reversed steps carried out in reversed sequence will perform the decoding desired.

The sub-shell type and the row of the position matrix used in encoding are determined by scanning the coordinates. With the possibility of even and odd coordinates in a "b" type sub-shell, the coordinates are grouped by type. This grouping reverses the interleaving used in encoding. Except for the "a" type sub-shells, where there are odd coordinates, there is extracted a binary number obtained from the signs of the coordinates (e.g., positive=0, negative=1) with a number of bits as follows:

for a "b" type sub-shell 7 bits for a "c" type sub-shell 15 bits

It is noted that the sign of last odd coordinate is ignored since its sign is determined by a modulo rule and contains no information. (In line with previous remarks regarding the interchangeability of coordinates or columns, it will be noted that any other coordinate than the last could have been used as the one determined by the modulo rules. It is at least conceptionally easier however to so treat the last coordinate).

Combining:

In reversing the splitting operation, the square of each coordinate gives the corresponding $r^2$ value and such coordinates are considered in pairs. For even type coordinates the value of R1 is chosen to be zero if the coordinate is positive and must be one if the coordinate is negative. In other cases as in the preferred method of dealing with odd coordinates where the signs have been dealt with separately, the initial values of R1 are zero.

The N' table has already been set out previously and the combining operation is initialized by setting table values corresponding I and J equal to the first and second shell numbers corresponding to each $r^2$ in the pair. Now multiply the second R1 by the table value for I and add the first $X_1$ to give an initial value of $X_2$. Now for each step, if the value of I is zero the process terminates, otherwise decrement I by 4 and increment J by 4 and multiply the I table value of $N_J'$ by the J table value of $N_J'$ add this to $X_2$ and repeat this step. When I has become zero the value of $X_2$ for the pair has been computed and the shell number is the final value of J with the sub-shell letter also determined previously. Pairs of the J and $X_2$ values are now combined into fours and these into eights etc. to finally obtain values of the remainder in 16 dimensions and shell value in the 16 dimension table.

Incorporate position matrix row and sign changes. With a "b" sub-shell the value of $X_{16}$ is multiplied by 30.

In the 'b' and 'c' type sub-shells, where the sign alternatives were not taken into account in the tables, the value for the remainder is now multiplied by a power of two and to this is added the remainder derived from the allowance for sign-changes of the coordinates.

The initial value of N is calculated by adding the total developed above to the value in the offset table for the sub-shell involved or (which is the same thing), the total is added to all the points in the points in the preceding sub-shells.

The number N may then be converted to binary digits or to another data form.

All the examples and embodiments described herein have dealt with the block encoding of numeric data in binary form. However, as noted in the introduction such numerical data need not be binary. For example in the 24, 8 and 16 dimensional methods the binary data is represented by the number N. It will be obvious that data represented in other bases than binary may be represented by the number N for encoding, detecting and decoding in accord with the invention. The number N at the decoder will almost always be converted into the data base form used at the encoder.

I claim:

1. Method of signalling on a communication channel comprising:

from a stream of numeric signals, converting said signals in blocks of b signals into K message point coordinates C1, C2, . . . CK for $40 \geq K > 4$, modulating a carrier signals in accord with the values of said message point coordinates, wherein said message point coordinates are determined as follows:

for each block of b signals determining a number N identifying the sequence of digits in said block, where for suitable packing of defined points by said coordinates in K dimensional space said coordinates are expressible in permissible integral values and the sum of the K coordinates so expressed has a permissible modulo value, providing a table of K dimensional shells where each shell comprises message points with permissible value coordinates and permissible modulo sum totals of the coordinates value which points at the same distance from a datum, said shells having a predetermined number of points with permissible value coordinates, identifying N in terms of a predetermined shell $S_K$ and a number D less than the number of said points thereon, using $S_K$, D provide a set of values, $S_F$, $X_F$ and $S_G$ $X_G$, where $S_F$ identifies a shell in F dimensions and $X_F$ identifies a point having permissible value coordinates on said F dimensional shell and $S_F$, $X_F$, $S_G$ $X_G$ collectively identify $S_K$, $D_K$, for each set $S_F$, $X_F$ and each $S_G X_G$ providing two sets of lower dimension S, X values, dimensions which summed equal F and G respectively and where each two sets of lower dimension S, X values identify the higher dimension S, X values from which they are developed, continuing the process of substituting two parts of lower dimension S, X values for higher dimension S, X values which they identify until they are obtained K sets of S, X values in one dimension, generating a coordinate of permissible value identifying each one dimensional S, X pair and identifying it.

2. Method of signalling on a communications channel comprising:

from a stream of numeric signals, converting said signals in blocks of b signals into K message point coordinates C1, C2 . . . CK for $40 \geq K \geq 4$, modulating a carrier signal in accordance with the values of said message point coordinates, wherein said message point coordinates are determined as follows:

for each block of b signals determining a number N identifying the sequence of digits in said block, determining for N/A a quotient M and a remainder C, where A is once or twice the number of selected alternate lattices in K dimensions and where A may equal 1 and hence M may equal N and C may equal 0, providing a table of K dimensional shells where each shell comprises message points with permissible value coordinates and permissible modulo sum totals of the coordinate values at the same distance from a datum, said shells have a predetermined number of points with permissible value coordinates, identifying M in terms of a predetermined shell $S_K$ and a number D less than the number of such points therein, using $S_K$, D to provide values, $S_F$, $X_F$ and $S_G$, $X_G$ where $S_F$ identifies a shell in F dimensions and $X_F$ identifies a point having permissible coordinates on said F dimensional shell and $S_F$, $X_F$, $S_G$, $X_G$ collectively identify $S_K$, D, for each $S_F$, $X_F$ and each $S_G$, $X_G$ developing a pair of lower dimension S, X values, dimensions which summed equal F and G respectively and where each pair of lower dimension S, X values identify the higher dimension S, X values from which they are developed, continuing the process of substituting S, X values for higher dimension S, X values which they identify until these are obtained K sets of SX values in one dimension, generating a coordinate of permissible value from each one dimensional S, X pair and identifying it, modifying the coordinates thus developed to other permissible coordinates which identify A and C as well as M.

3. Means for signalling on a communications channel, comprising:

means for converting blocks of b signal from a stream of numeric signals into K message point coordinates C1, C2 . . . CK for $40 \geq K \geq 4$, means for modulating a carrier signal in accord with the values of said message point coordinates, said means for converting including the following:

means for each sequence of b digits determining a number N identifying the sequence of signals in said block, means for providing a table of K dimensional shells where each shell comprises message points with permissible value coordinates and permissible modulo sum totals of the coordinate values which points are at the same distance from a datum, said shells having a predetermined number of points with permissible value coordinates, means for identifying N in terms of a predetermined shell $S_K$ and a number D less than the number of said points thereon, means for using $S_K$, D to provide sets of values $S_F$, $X_F$ and $S_G$, $X_G$ where $S_F$ identifies a shell in F dimensions and $X_F$ identifies a point having permissible value coordinates on said F dimensional shell and $S_F$, $X_F$, $S_G$, $X_G$ collectively identify $S_K$ $D_K$, means responsive to each set $S_F$, $X_F$ and each set $S_G$, $X_G$ for providing two sets of lower dimension S, X values for dimensions which summed equal F and G respectively and where each two sets of lower dimension S, X values identify the higher dimension set of S, X values from which they are developed, means for continuing the process of substituting two pairs of lower dimension S, X values for higher dimension S, X values which they identify until there are K sets of S, X values in one dimension, means for generating a coordinate a permissible magnitude and sign, identifying each one dimensional S, X pair.

4. Means for signalling on a communications channel, comprising:

means for converting blocks of b signals from a stream of numeric signals into K message point coordinates C1, C2 . . . CK for $40 \geq K > 4$, means for modulating a carrier signal in accord with the values of said message point coordinates, where for suitable packing of said points in K dimensional space said coordinates are expressible in permissible integral values and the sum of the K coordinates so expressed has a permissible modulo value, said means for converting including the following;

means for each sequence of b digits determining a number N identifying the sequence of b digits, means for determining for N/A a quotient M and a remainder C where A is the number of selected alternate lattices in K dimensions or double such number if even or odd coordinates may be used and where A may equal 1 and hence M may equal N and C may equal 0, means for consulting a table of K dimensional shells where each shell comprises message points and a permissible modulo sum total of the values of the coordinates, said shells having a perdetermined number of points with permissible value coordinates, means for identifying M in terms of a predetermined shell $S_K$ and a number D less than the number of said points thereon, means for using $S_K$, D to ptovide sets of values $S_F$, $X_F$ and $S_G$, $X_G$ where $S_F$ identifies a shell in F dimensions and $X_F$ defines a point having permissible value coordinates on said F dimensional shell, and $S_F$, $X_F$, $S_G$ $X_G$ collectively identify $S_K$, $D_K$, means responsive to each set $S_F$, $X_F$ and each set $S_G$, $X_G$ for providing two sets of lower dimension S, X values, for dimensions which summed equal F and G respectively and where each two sets of lower dimension S, X values identify the higher dimension set of S, X values from which they are developed, means for continuing the process of subtituting two pairs of lower dimension S, X values for higher dimension S, X values which they identify until there are K sets of S, X values in one dimension, means for generating a coordinate of permissible magnitude and sign, identifying each one dimensional S, X pair, means for modifying the coordinates thus developed to other permissible coordinates which identify A and C as well as M.

5. Method as claimed in claim 1 wherein K=24 and A=8192.

6. Method as claimed in claim 2 wherein K=24 and A=8192.

7. Means as claimed in claim 3 wherein K=25 and A=8192.

8. Means for signalling on a communications channel comprising:

means for converting blocks of b signals into K message point coordinates C1, C2, . . . CK, for $40 \geq K > 4$, where for suitable packing of the message points in K dimensional space, rules are provided for coordinate values and the modulo sum of the coordinates when the coordinates are expressed as integers, means for modulating a carrier signal in accord with said message point coordinates, means for transmitting said modulated carrier signal, wherein said means for converting blocks of b signals comprises:

means for determining a number N identifying the numerical signal sequence in said block, means providing a table of the number of available coordinate values in 1 dimension which satisfy the coordinate value rules for K dimensions, for regular intervals of $r^2$ where $r^2$ is the square of the distance in coordinate units from a point, defined by the number of coordinates corresponding to the dimension, to a datum point, means providing the numbers of corresponding values in higher dimension for such regular values of $r^2$ up to dimension K, where such numbers in higher dimension are calculated in accord with the algorithm, $$V_{H,n} = \sum_{I=0}^{I=n} V_{F,I} X V_{G,I-n}$$

where $V_H$, $V_F$, $V_G$, $V_K$ are the number of available sets of message points in dimensions H, F, G, K, respectively, F+G=H and n is the number of regular intervals of $r^2$, means for determining the value of n, for $V_{K,n}$ where the total of values of $V_K$, in a predetermined sequence of such values preceeding $V_{K,n}$, is as large as possible without exceeding N, means for determining the value of $X_K$, being N less such total, means, for values of $X_K$, n for determining K corresponding coordinates C1, C2 . . . CK identifying $X_K$, n.

9. Means for signalling on a communications channel comprising:

means for converting blocks of b signals into K message point coordinates C1, C2, . . . CK, for $40 \geq K > 4$, where for suitable packing of the message points in K dimensional space, rules are provided for coordinate values and for the modulo sum of the coordinates when the coordinate values are expressed as integers, means for modulating a carrier signal in accord with said message point coordinates, means for transmitting said modulated carrier signal, wherein said means for converting blocks of b signals comprises:

means for determining a number N identifying the signal sequence in said block, means for determining for N/A a quotient M and a remainder C where A is the product of the number of selected alternate lattices and choice as to positive and negative coordinates in K dimensions and where A may equal 1 in which event M will equal N and C will equal 0, means providing a table of the number of available coordinate values in 1 dimension which satisfy the coordinate value rules for the K coordinates, for regular intervals of $r^2$, where $r^2$ is the square of the distance in the coordinate units from a point defined by the number of coordinate values corresponding to a dimension, to a datum point, means providing the numbers of corresponding values in higher dimension for such regular values of $r^2$ up to dimension K, where such numbers in higher dimension are calculated in accord with the algorithm, $$V_{H,n} = \sum_{I=0}^{I=n} V_{F,I} X V_{G,I-n}$$

where $V_H$, $V_F$, $V_G$, $V_K$, are the number of available sets of coordinate values in dimension H, F, G, K, respectively, F+G=H and n is the number of regular intervals of $r^2$, means for determining the value of n, for $V_{K,n}$ where the total number of values of $V_K$ in a predetermined sequence of such values preceeding $V_{K,n}$ is as large as possible without exceeding M, means for determining the value of $X_K$, being N less such total, means, for values of $X_{K,n}$ for determining K corresponding coordinates identifying $X_{K,n}$, where $A \neq 1$ $C \neq 0$ modifying the coordinates in accord with C.

10. Means for signalling on a communications channel, comprising:

means for converting numeric signals in blocks of b signals into K message point coordinates C1, C2, ... CK, for $40 \geq K > 4$, where for suitable packing of the message points in K dimensional space, rules are provided for coordinate values and for the modulo sum of the coordinates when the coordinate values are expressed as integers, means for modulating a carrier signal in accord with said message point coordinates, means for transmitting said modulated carrier signal, means for determining said message point coordinates as follows:

means for determining, for each block of b signals, a number N identifying the numeric signal sequence in said block, means for determining, for each N, a value $r^2$ and a value $X_K$, where $r^2$ is one of a set of specific values, a number of message points occur whose individual values and whose modulo sum satisfy the requirements for coordinates C1, C2, ... CK and where $$r^2 = \sum_{d=1}^{d=k} (Cd - CDd)$$

where d is integral, CD1, CD2, ... CDK is a datum point and $X_K$ identifies a specific message point with such $r^2$, and $r^2$ and $X_K$ identify N, for $r^2$ and $X_K$ means for determining K coordinates C1, C2, ... CK, identifying $r^2$, $X_K$.

11. Means for signalling in a communications channel comprising:

means for converting numeric signals in blocks of b signals into K message point coordinates C1, C2, ... CK for $40 \geq K > 4$, including means for determining a number N identifying the numeric signals in each block, means for transmitting said modulated carrier signal, means for determining said message point coordinates as follows:

means for determining for N/A a quotient M and a remainder C where A is the product of selected alternate lattices and 2 if even and odd coordinates are permissible in K dimensions and where A may equal 1 and hence M may equal N and C may equal 0, means for determining for each M a value $r^2$ and a value $X_K$ where a number of message points occur whose individual message points and said sum satisfy the requirements for coordinates C1, C2, ... CK and $$r^2 = \sum_{d=1}^{d=k} (Cd - CDd)^2,$$

where d has integral values, CD1, CD2, ... CDK are the coordinates of a datum point, and $X_K$ relates to a specific message point with such $r^2$, and $r^2$ and $X_K$ identify N, means, for values $r^2$ and $X^K$ for determining K coordinates C1, C2, ... CK, where $A \neq 0$, $C \neq 0$, modifying the coordinates in accord with C.

12. Method for signalling as claimed in claim 5 where K=24 A=8192 and the selected lattices are the 4096 pattern vectors obtainable from a Leech matrix, where the coordinates derived from each vector satisfy the following rules:

a set of 24 coordinates must be representable by integral values and, so represented, are all even or all odd, if all even the sum of such coordinates must be 0 modulo 8, if all odd the sum of such coordinates must be 4 modulo 8.

13. Means for signalling as claimed in claim 8, wherein K=24, and the coordinate rules are:

a set of 24 coordinates must be representable by integral values and, so represented, are all even or all odd, if all even the sum of such coordinates must be 0 modulo 8, if all odd the sum of such coordinates must be 4 modulo 8.

14. Means for signalling as claimed in claim 8 wherein K=8, and the coordinate rules are:

a set of 8 coordinates must be representable by integral values and, so represented, are all even or all odd, the sum of the coordinates must be 0 modulo 4.

15. Means for signalling as claimed in claim 9 where K=24 A=8192 and the selected lattices are the 4096 pattern vectors obtainable from a Leech matrix with or without interchanged columns, where the coordinates derived from each vector satisfy the following rules:

a set of 24 coordinates must be representable by integral values and, so represented, are all even or all odd, if all even the sum of such coordinates must be 0 modulo 8, if all odd the sum of such coordinates must be 4 modulo 8.

16. Means for signalling as claimed in claim 10 wherein K=24, and the coordinate rules are:

a set of 24 coordinates must be representable by integral values, and so represented, are all even or all odd, if all even the sum of such coordinates must be 0 modulo 8, if all odd the sum of such coordinates must be 4 modulo 8.

17. Means for signalling as claimed in claim 10 wherein K=8, and the coordinate rules are:

a set of 8 coordinates must be representable by integral values and, so represented, are all even or all odd, the sum of the coordinates must be 0 modulo 4.

18. Means for signalling as claimed in claim 10 where K=16, and the coordinate rules are:

a set of 16 coordinates must be representable by in accord with a row of a 16 dimension Hadamard matrix of ones and zeros, with any predetermined interchangement of rows and columns where the coordinates must be even integers where the matrix has one of a one or a zero and odd integers where the matrix has the other of a one or a zero, the sum of the coordinates must be 0 modulo 4.

19. Means of signalling as claimed in claim 11 where K=24 A=8192 and the selected lattices are the 4096 pattern vectors obtainable from a Leech matrix, where the coordinates derived from each vector satisfy the following rules:

a set of 24 coordinates must be representable by integral values and, so represented, all even or all odd, if all even the sum of such coordinates must be 0 modulo 8, if all odd the sum of such coordinates must be 4 modulo 8.

20. Means for signalling on a communications channel comprising:

means for converting a block of b numeric signals into a number N identifying the numeric signal sequence in said block, means for converting said number N into 24 message point coordinates C1, C2, ... C24, identifying said number N, wherein said coordinates may be expressed in integral form and in such integral form are chosen to have all even values with a sum of 0 modulo 8 or all odd values with a sum of 4 modulo 8, means for modulating carrier signal in accord with the value of said message point coordinates, means for transmitting said modulated carrier signal.

21. Means for signalling on a communications channel as claimed in claim 20 wherein said means for converting N into 24 message point coordinates comprises, means providing a table for indicating the number of available even integral coordinate values in 1 dimension for regular intervals of $r^2$ where $r^2$ is the square of the distance in coordinate units from a point defined by the number of coordinates corresponding to the dimension to a datum point, mean for providing a similar table for the odd integral coordinate values, means corresponding to each said table providing the numbers of message points in higher dimension for such regular values of $r^2$ up to the 24th dimension, where such numbers in higher dimension correspond to those calculated in accord with the algorithm, $$V_{H,n} = \sum_{I=0}^{I=n} V_{F,I} X V_{G,I-n}$$

where $V_H$, $V_F$, $V_G$, are the number of such corresponding values in dimension H, F, G, respectively F+G=H and n is the number of regular intervals of $r^2$, means for determining a sequence of numbers of message point values in 24 dimensions utilizing the results of the applications of such algorithm on the table of even originating values and separately on the table of odd originating values, and eliminating from said numbers, those were the 24 coordinates do not satisfy the modulo sum requirements, means for assigning a range of N to each value of $r^2$ and whether even-originating or odd-originating, said range of N being not less than the number of a available values for the corresponding $r^2$ and whether even-originating or odd-originating, means for determining from N and the corresponding value of $r^2$, and whether even-originating or odd-originating a value $X_{24}$ identifying N in one of said ranges, means for using $X_{24}$, $r^2$ and even-originating or odd-originating for determining coordinates C1, C2, ... C24, identifying $X_{24}$, $r^2$.

22. Means for signalling on a communications channel as claimed in claim 19 where said means for converting N into 24 message point coordinates comprises, means providing a table for indicating the number of available even integral coordinate values in 1 dimension for regular intervals of $r^2$ where $r^2$ is the square of the distance in coordinate units from a point having such value to a datum point, means for providing a similar table for the odd integral coordinate values, means corresponding to each said table providing the numbers of message points in higher dimension for such regular values of $r^2$ up to the 24th dimension, where such numbers of message points in higher dimension correspond to those calculated in accord with the algorithm, $$V_{H,n} = \sum_{I=0}^{I=n} V_{F,I} X V_{G,I-n}$$

where $V_H$, $V_F$, $V_G$ are the number of such corresponding message points in dimensions H, F, G F+G=H and n is the number of regular intervals of $r^2$, means for determining a sequence of numbers of available message points in 24 dimensions utilizing the results of the applications of such algorithm on the even integral table and on the odd integral table, and eliminating from said numbers those where the 24 coordinates do not satisfy the modulo sum requirements, means for determining from N/B giving a quotient Q and a remainder C where B represents 2 to the power of the number of available sign changes, means for assigning a range of Q to each value of $r^2$ and whether even-originating or odd-originating, said range of Q being not less than the number of available message points for the corresponding $r^2$ and whether even-originating or odd-originating, means for determining from Q and $r^2$ even-originating or odd-originating, a value $X_{24}$ identifying Q in said range, means for using $X_{24}$, $r^2$ and whether even-originating or odd-originating for determining values for the message point coordinates, means for modifying said message point coordinates in accord with the value C to provide the coordinates C1, C2, ... C24.

23. Means for signalling on a communications channel as claimed in claim 20 wherein said means for converting N into 24 message point coordinates comprises:

means for providing a table for indicating the number of available integral coordinate values in one dimension having values 0 modulo 4 for $r^2=0$, 16, 32 ... 16n, where $r^2$ is the square of the coordinate value, means corresponding to said table for providing the numbers of corresponding message points in higher dimensions for such values of $r^2$, where such numbers in higher dimension are calculated in accord with the algorithm:

$$V_{H,n} = \sum_{I=0}^{I=n} V_{F,I} X V_{G,I-n}$$

where $V_H$ is the number of such corresponding message points in dimension H, F+G=H and n is the number of intervals of $r^2$, means for determining a sequence of numbers of available message points in 24 dimensions using the rsults of the applications of said algorithm to ascertain such numbers for values of $r^2$=multiplies 32, means for providing the result of N/8192 as quotient M and remainder C where C represents the choice of one of 4096 Leech lattice vectors and the choice of whether the coordinates shall be even or odd, means for assigning a value of M to each value of $r^2$ associated with said sequence, said range of M being not less than the number of available values for the corresponding $r^2$, means for determining for M and the corresponding value of $r^2$, a value D identifying M in said range, means for using D, $r^2$ to determine 24 message point coordinates, means for modifying said 24 message point coordinates in accord with C to produce the coordinates C1, C2, ... C24.

24. Means for signalling on a communications channel comprising:

means for converting numeric signals in blocks of b signals into 24 message point coordinates C1, C2, ... C24, means for modulating a carrier signal in accord with the value of said message point coordinates, means for transmitting said modulated carrier signal, wherein said means for converting said numeric signals comprises, means, for each block of b digits determining a number N identifying said block, means for assigning each number N to a shell of message points in K space, which message points have integral coordinates and satisfy the rules:

that the coordinates are either all even with a sum of 0 modulo 8 or all odd with a sum of 4 modulo 8, where a shell comprises the number of message points where specific $$r^2 = \Sigma (Cd - CDd)^2$$

where d has integral values; CD1, CD2, ... CD24 represents a datum point, and $r^2$ has regular values 0, 32, 64, ...

means for deriving from N and said shell in 24 space, a pair of shells in dimensions F and G each with an identifying value where F+G=H, and H in the first derivation=24, the value $r^2$ is the square of the distance of the shell from the datum having points in common with CD1, CD2, ... CDF in F space and CD1, CD2, ... CDG in G space, respectively, means for continuing to effect such derivations to the pairs of shells and identifying values until 24 shells and identifying values are obtained in one dimension, means for deriving said coordinates C1, C2, ... C24 from said 24 shell and identifying values.

25. Means for signalling on a communications channel comprising:

means for converting numeric signals in blocks of b signals into 24 message point coordinates C1, C2, ... C24, means for modulating a carrier signal in accord with with value of said message point coordinates, means for transmitting said modulated carrier signals, wherein said means for converting said numeric signals comprises, means for each block of b digits to determine a number N identifying said block, means for providing the result of N/8192 as a quotient M and remainder C where C represents the choice of one of 4096 Leech lattice vectors and the choice of whether the coordinates shall be even or odd, means for assigning each number M to a shell of message points in 24 space, which message points, have integral coordinates and satisfy the rules:

that the coordinates are either all even with a sum of 0 modulo 8 or all odd with a sum of 4 modulo 8, where a shell comprises the number of message points where d has integral values for which $$r^2 = \sum_{d=1}^{d=24} (Cd)^2$$

for a given r, means for deriving from M and said shell in 24 dimensional space, by a splitting algorithm, a pair of shells in dimensions F and G each shell with an identifying value where F+G=24 the value for $r^2$ is the square of the distance of the shell from the origin in F space and G space respectively, means for continuing to apply said splitting algorithm to the pairs of shells in dimensions F and G and identifying values until 24 shells and identifying values are obtained in one dimension, means for deriving 24 message point coordinates from said 24 shells and identifying values, means for modifying said last mentioned 24 message point coordinates in accord with the value of C to produce message point coordinates C1, C2, ... C24.

26. Means for detection of received carrier signals modulated in accord with coordinate values C1, C2, ... C24 conforming to a pattern of vectors derived from a pattern vector from the Leech lattice, means for demodulating said signals, means for comparing the demodulation products modulo 4 with 4096 even and 4096 odd pattern vectors, means for determining the pattern vector for which the demodulation products show the smallest error, means for using said last mention pattern vector and said coordinates to determine a number N identified thereby, means for providing a block of b numeric signals identified by said number N.

* * * * *